United States Patent [19]

Abbott et al.

[11] 3,806,635

[45] Apr. 23, 1974

[54] MULTIPLEX COLOR TELEVISION DEMODULATOR

[75] Inventors: Harold W. Abbott, Syracuse; Joseph J. Zampini, Liverpool, both of N.Y.

[73] Assignee: General Electric Company, Syracuse, N.Y.

[22] Filed: Aug. 21, 1972

[21] Appl. No.: 282,444

[52] U.S. Cl. ............ 178/5.4 SD
[51] Int. Cl. ............ H04r 9/50
[58] Field of Search ........ 178/5.4 R, 5.4 SD; 329/50

[56] References Cited

UNITED STATES PATENTS

| | | | |
|---|---|---|---|
| 3,591,707 | 7/1971 | Abbott | 178/5.4 SD |
| 3,592,960 | 7/1971 | Cushing et al. | 178/5.4 SD |

*Primary Examiner*—Robert L. Richardson
*Attorney, Agent, or Firm*—Richard V. Lang; Carl W. Baker; Frank L. Neuhauser

[57] ABSTRACT

A color television demodulator is disclosed for processing the NTSC color signal. The video signal is converted to base band and two color difference components are derived in two four-quadrant multipliers during video. During burst, which precedes each line of video information, two control signals are derived in a time multiplexed fashion from the same pair of four-quadrant multipliers. The demodulated color difference components are re-combined with the luminance to provide the R, G, B signals for display. The demodulated burst is used to derive a phase control voltage for synchronizing the local oscillator used in the demodulation process. The demodulated burst is also used for deriving a color amplitude control voltage for stabilizing the color intensity. The demodulator circuitry is designed for integrated circuit fabrication with a minimum "pin" count and a minimum of outboarded components.

The multiplex color television demodulator of the present application, which is the invention of H. W. Abbott and J. J. Zampini, is related to the subsequent invention of H. W. Abbott, R. J. McFadyen and W. Peil, and embodied in a patent application similarly entitled, assigned to the Assignee of the present application and filed concurrently.

11 Claims, 5 Drawing Figures

MULTIPLEX COLOR TELEVISION DEMODULATOR

BACKGROUND OF THE INVENTION:

1. Field of the Invention

The invention relates to color television demodulation and more particularly to the derivation of the individual color signals from an NTSC signal in a form suitable for application to a three color display. The invention also relates to provision of ancillary control functions for use in the derivation of the individual color signals. Such controls include automatic phase control used to insure phase accuracy in the regenerated subcarrier and consequent accuracy in the demodulation angles, automatic color control to insure stability in the amount of color in the display, manual controls of the demodulation angles (which affect hue) and color intensity, and an automatic color killer, all normally associated with color demodulation.

2. Description of the Prior Art

The design of color television receivers has undergone a major recent change with the advent of integrated circuit technology. Integrated circuitry makes it possible to take a fresh new look at the total television receiver. Integrated circuitry provides the possibility of large numbers of active elements and resistive elements without cost penalties, but places a premium on low pin counts for external connections and on non-integrable components. From a topological standpoint it becomes possible to construct most of the active circuitry of a television receiver in a handful of chips, perhaps five, six or seven, with supplemental components and supplemental circuits, principally where high power or high voltage proscribe IC techniques.

The individual IC circuits themselves, while falling into common patterns — simple amplifiers, differential amplifiers, amplifiers arranged in cascade and in tiered ranks, show a versatility for organization into highly complex function wholes. For instance, the color television demodulator itself may be executed in IC form as set forth in U. S. Pat. No. 3,591,707 of H. W. Abbott, entitled "Color Television Demodulator," and assigned to the Assignee of the present invention. In that patent, the demodulation function is performed by two four-quadrant multipliers, each formed of two ranks of differential amplifiers and supplemented by transistors acting as current sources and as simple amplifiers. The foregoing Abbott demodulator is readily fabricated on a single chip, but requires the provision of an external oscillator for use in the modulation process, and a complex assembly of ancillary circuits for synchronizing the oscillator, for stabilizing the color intensity and performing the other ancillary functions noted earlier. These ancillary functions all intimately affect the performance of the demodulator and conversely the performance of the demodulator intimately affects the performance of these functions.

The present invention is intended to provide a color television demodulator incorporating both the demodulation and the ancillary control functions. It may have been recognized that, ideally, these functions should be electrically and topologically integrated into a common circuit complex. Unfortunately, the interconnection of complex electrical circuitry has rarely been straightforward. This is particularly true when the circuitry entails interactive feedback networds. Furthermore, while idealized configurations are readily envisioned using theoretical and intuitive insights, practical limitations have been in continuous conflict with their effective realization.

The particular case of the color television demodulator is the case in point. One notes that the color television signal contains color burst — the control information, followed in time sequence by the video information for the following horizontal line. One may even recognize the signal processing implications that follow from this time sequence. However, for practical reasons, including the fact that synchronous processing that could perform both processing tasks was not commonplace, the industry has standardized the pedestrian approach to the demodulation and control problem and not the potential time multiplex approach. Conventionally, the control information (the burst) and the picture information are mutually separated by suitable gates. After separation has occurred, one circuit apparatus is assigned to process the control information and another circuit apparatus is assigned to proccess the video.

This time sequence in control and video information provides the potentiality, which is herein realized in practical form, of not separating the control information from the video information and of using the same demodulation apparatus for sequentially processing the control and the picture information.

SUMMARY OF THE INVENTION

Accordingly, it is an object of the present invention to provide an improved color television demodulator.

It is another object of the present invention to provide an improved multiplex color television demodulator which performs both the demodulation and control functions.

It is a further object of the invention to provide a multiplex color television demodulator which uses the same demodulator components in sequentially performing the demodulation and control functions.

It is another object of the invention to provide an improved multiplex color television demodulator performing the demodulation and control functions suitable for integrated circuit fabrication.

These and other objects of the invention are achieved in a multiplex color television demodulator comprising a source of detected video signals including a luminance signal; a chrominance signal having two chrominance components modulated in quadrature on a color subcarrier; and a color burst signal at the frequency of said color subcarrier and in phase therewith, the clor burst occurring in alternation with the luminance and chrominance signal; wave generating means included in an automatic phase control loop for locally generating a wave at the frequency of and in predetermined phase relationship to said color burst; a four-quadrant multiplier coupled to the video source at one input, and to the wave generating means at the other input for synchronously demodulating said chrominance signal and the color burst at pre-assigned angles by multiplication; a second four-quadrant multiplier coupled to the video source at one input, and to the wave generating means at the other input for synchronously demodulating the chrominance signal and the color burst at pre-assigned angles by multiplication, the detection angles of said chrominance information in the two multipliers being substantially mutually orthogonal; and the detection angles of the burst in the two multipliers being substantially orthogonal; means coupled to the output of the second multiplier for deriving an error voltage representative of the phase difference between burst and the locally generated wave and applying the error voltage to the wave generating means for achieving the predetermined phase relationship; and means coupled to the outputs of said first and second multipliers for deriving two substantially mutually orthogonal chrominance signals.

In accordance with a further aspect of the invention, an automatic gain control network is provided comprising an amplifier of controllable gain introduced between the video source and the multipliers for amplifying the chrominance signal and the color burst prior to application to the multipliers and including means coupled to the output of the first multiplier for deriving a voltage representative of the magnitude of the burst for control of the amplification means.

In the embodiment herein claimed, the output of the local wave generating means is coupled to the two multiplier inputs in like phase and amplitude, while phase shift means are introduced between the video source and the multiplier inputs for introducing a relative delay between the video signals applied to the two multipliers. The phase shift means includes a gated manual control which provides for manual phase adjustment operative during burst and which readjusts the phase of the oscillator through the phase control loop for manual tint control. (During video there is no phase adjustment.) To achieve the desired relative delays in video and burst demodulation, a delay line having a delay approximately 90° at the color subcarrier frequency is provided, and the phase shift means are formed into two channels, one channel for supplying video and burst to one multiplier and the other channel supplying video and burst to the other multiplier.

In accordance with another aspect of the invention, gated manually controlled amplification means are provided for varying the output of the local wave generating means supplied to the multipliers operative during video for manual color control purposes. (During burst there is no amplitude adjustment.) Finally, color demodulation disabling means (the color killer) are provided, responsive to the burst output in the first multiplier for decoupling the wave generating means from the multipliers during video, when the burst falls below a predetermined level.

BRIEF DESCRIPTION OF THE DRAWING

The novel and distinctive features of the invention are set forth in the claims appended to the present application. The invention itself, however, together with the further objects and advantages thereof may be best understood by reference to the following description and accompanying drawings in which:

DESCRIPTION OF THE PREFERRED EMBODIMENTS

Figure 1:
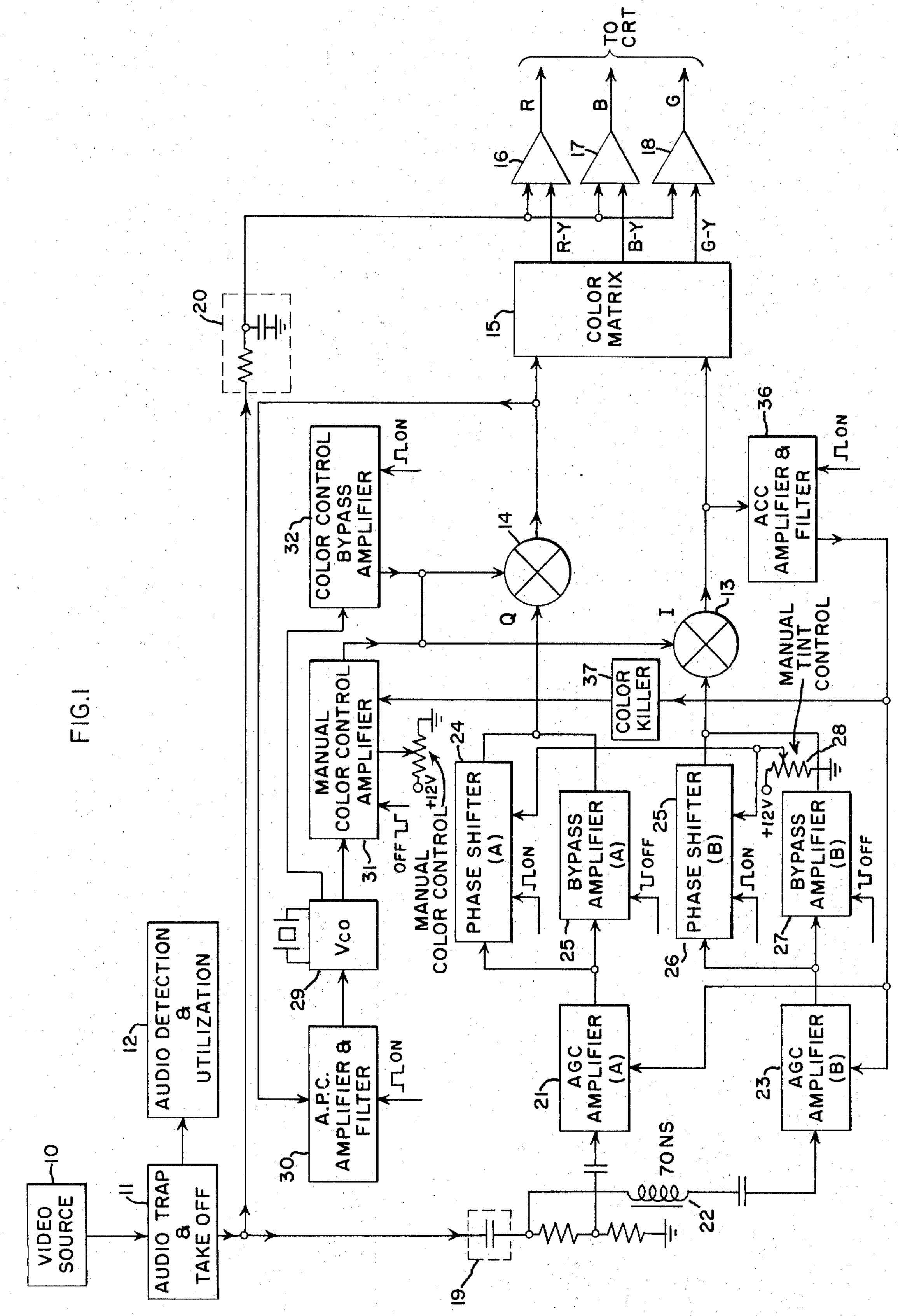
FIG. 1 is a block diagram illustrating the overall organization of a first embodiment of the multiplex color television demodulator.

Referring now to FIG. 1, a multiplexed color demodulator in accordance with the present invention is shown in a simplified functional block diagram. The color demodulator derives its input from a video source 10 which provides the demodulated luminance signal, the chrominance signal modulated on the color subcarrier, the audio signal on its carrier, and the color burst. Preferably, all elements of the signal are at their normal levels relative to one another, with the video signal level approximating 1 volt peak to peak. The color demodulator employs the video elements of the transmitted signal to produce the separate color signals required for operation of a color cathode ray tube.

The present apparatus not only performs the basic color signal demodulation function but also performs certain desirable internal and external control functions in a time multiplexed fashion. The internal control functions involve automatic phase control of the local oscillator used in the color demodulation process, automatic control of the chromaticity of the composite RGB signal and an automatic control for inactivating the color demodulator when color is not present at a sufficient intensity in the received signal (the color killer). The external control functions include manual controls for adjusting the chromaticity and the tint (or hue) of the output color signal.

The basic color demodulator function is performed in the present embodiment in a manner similar to that described in the U. S. Pat. No. 3,591,707 of H. W. Abbott, entitled "Color Television Demodulator," assigned to the Assignee of the present application. Color demodulation is performed by a pair of linear four-quadrant multipliers 13 and 14 which synchronously demodulate the chrominance signal, producing in the embodiment under consideration demodulated I and Q components respectively. The I and Q components are then mixed in a color matrix 15 to obtain color difference signals, respectively (R – Y), (B – Y) and (G – Y), components. The color difference components are then added in driver stages 16, 17 and 18 to the luminance component (Y) to provide the separate R, B, G signals for operating the signal grids of a color cathode ray tube.

As pointed out in the referenced patent, the foregoing method of synchronous color demodulation puts minimum demands upon the filtering in a color television receiver both prior and subsequent to video detection. In the embodiment of FIG. 1, the video source 10 may be a video detector operating either synchronously or as a simple rectifier and deriving the full signal without pre-emphasis or de-emphasis of the individual signal components. Optionally, the video detector may be provided with following wide band amplification. An audio take-off and trap 11 is provided at the video output of the video source, which couples the audio output to a suitable audio detection and utilization means shown at 12. If the video detector is linear, the audio ordinarily need not be de-emphasized prior to video detection, nor need the sound trapping be complete prior to chrominance detection. The luminance, chrominance and (normally) color burst portions of the signal thus appear at the output of the audio take-off and trap 11 without appreciable attenuation with audio signal levels reduced about 20 db, and are coupled from this point to subsequent portions of the color demodulator.

Filtering subsequent to video detection is simplified by the present mode of color demodulation. Separation of the luminance and chrominance portions of a given channel need not be complete in either the subsequent chrominance or the luminance processing paths of the color demodulator. Both luminance and chrominance components may be coupled to the input of the color demodulators 13, 14 with minimum filtering to attenuate the undesired luminance. Such filtering may be provided by an undersized coupling capacitor as shown at 19, which discriminates against the lower frequency luminance components and favors the chrominance components modulated on the higher frequency color subcarrier. In the luminance signal path on the other hand, at some point prior to combination of the luminance signal (Y) with the detected chrominance components, it may be desirable to de-emphasize the undemodulated color terms appearing at subcarrier frequency in combination with the lower frequency luminance terms. This discrimination against the luminance terms may be accomplished by a minimal low pass filter 20 comprising a series resistance and a shunt capacitor set to have a cut-off frequency at or slightly below the frequency of the color subcarrier. As pointed out in said Abbott patent, the foregoing linear detection process greatly reduces the interference produced at the color processor output by companion signals, and greatly reduces the need for isolative filtering.

Prior to further discussion of the color demodulation process or the control functions per se, an introductory review of the method of multiplexing these two functions will be undertaken. As will be seen, the demodulation and control functions entail the use of the color demodulators on a time shared or time multiplexed basis. This is possible because of the alternating transmission of video and control signals. During video transmission, the demodulators process the video signal with a locally derived color subcarrier which is generated continuously. During fly-back, however, or more precisely during the period between video transmission that color burst is being transmitted, the demodulators synchronously process the color burst. An automatic phase control loop synchronizes the local oscillator with the color burst so as to recreate a continuous wave of subcarrier frequency suitable for synchronous detection of the chrominance signal. Also, during burst, the automatic color control samples the burst portion of the signal and standardizes the gain in the chrominance path against changes in amplitude of the burst. The manual tint control, as will be explained, functions during the burst interval to adjust the phase of the subcarrier at the multiplier inputs in relation to the chrominance signals. By adjusting the synchronous detection angle of the chrominance signal the hue or tint of the demodulated color signal is controlled. The manual chromaticity or color control, on the other hand, operates during the video portion of the signal to reduce the gain in the color demodulation process and adjusts the magnitude of the chrominance portion of the signal in relation to the chrominance portion.

The above functions are thus suitable for time multiplexing as between the periods of video and the periods of burst transmission. Multiplexing is achieved by a plurality of gates distributed throughout the chroma demodulator for suitably enabling or disabling the several functional circuits. Enabling and disabling of the individual gates is achieved generally by either a positive going or an inverted negative gain pulse derived from a pulse inverter timed to include the period that burst is being transmitted. The positive going pulse is available from the horizontal sweep portions of the television receiver and is generated during horizontal flyback. The pulse is of suitable magnitude to turn on those gates which are normally off during video into an "on" condition during the burst. Inversion provides a complementary negative going pulse to turn off those gates during burst which are normally "on" during video. In respect to timing, these pulses commence slightly before the color burst and continue slightly after the burst has terminated to allow for timing error in either the receiver or transmitter. The gating pulses and the strategically placed gates thus provide the mechanism for time multiplexed operation of the various blocks of the color demodulator. The operation will be treated in detail in the discussion of the circuit diagram.

Returning now to a consideration of the individual blocks of FIG. 1, the video signal with luminance terms de-emphasized is avilable at the output of the high pass filter capacitor 19 for coupling to the chrominance demodulators. This output is coupled to the input of automatic gain control (AGC) amplifier 21 without delay. It is also coupled through a delay line 22 to an AGC amplifier 23. This delay in the delay line 22 is typically 70 nanoseconds corresponding to an angular separation of about 80° to 90° at the color subcarrier frequency.

The AGC amplifiers 21 and 23 operate continuously and amplify both the applied chrominance and color burst terms, coupling them to the gated subsequent stages 24 through 27. The AGC amplifiers 21 and 23 stabilize the amplitude of the demodulated color components, and a D.C. control connection is provided to the individual AGC amplifiers for that purpose. The output of AGC amplifier 21 is coupled to the gated phase shifter 24. The phase shifter 24 is designed to be gated "on" during the color burst and provides means for manually phase shifting the burst. The output of the amplifier 21 is also coupled to the by-pass amplifier 25 which is designed to be gated "off" during color burst and which passes the video information to its output erminals. The outputs of the blocks 24 and 25 are combined and applied to one input terminal of the four-quadrant multiplier 14 used for "Q" demodulation in multiplex with a first automatic control function. The output of the AGC amplifier 23 is in turn coupled to the phase shifter 26 designed to be gated "on" during burst for manually phase shifting the burst and coupled to the by-pass amplifier 27 designed to be gated "off" during color burst but "on" for transmission of the video information. The outputs of the blocks 26 and 27 are combined and applied to one input of the four-quadrant multiplier 13 designed for "I" demodulation in multiplex with a second automatic control function.

Manual control of the phase shifters 24 and 26 is achieved by voltage adjustment, as illustrated at 28. A single control shifts the phase of the color subcarrier as it is passed through both the phase shifters 24, 26 to the demodulators 13, 14. The effect of this phase adjustment is to control the tint of the demodulated color signal, adjusting the detection angle of the demodulators 13 and 14 through its effect upon the local oscillator 23 as will be subsequently explained.

The four-quadrant multipliers 13 and 14 are true product multipliers which perform the synchronous detection function for multiplying two input waveforms to provide a "demodulated" output waveform. In performance of the video demodulation function, the video signals derived from the stages 25 and 27 are applied to one set of multiplier input terminals while a regenerated sub-carrier signal is applied to a second set of multiplier input terminals. The result, when the regenerated sub-carrier signal is in the correct phase, is to produce at the output terminals of the demodulators 13 and 14 the "I" and "Q" demodulation terms.

The regenerated sub-carrier signal, which is required for video detection is derived from a crystal stabilized voltage controlled local oscillator 29 set at the sub-carrier frequency. This oscillator has a high frequency accuracy provided by the use of a crystal and it operates continuously. Precise phase correspondence with the video signal is provided by means of an automatic phase lock loop coupled to the output of the Q demodulator 14. The phase lock loop entails the use of a gated automatic phase control amplifier and filter 30, which is gated to sense phase error during burst, and which applies a continuous correctional voltage to the voltage controlled oscillator 29 to hold it continuously at correct phase.

The output of the voltage controlled oscillator 29 is supplied to the two demodulators through a gated manual color control amplifier 31 of manually adjustable gain and a gated constant gain color control by-pass amplifier 32. Both amplifiers 31 and 32 are designed to set the amplitude with "minimum" affect upon the phase of the locally generated wave in the phase control loop. The individual gain effects are achieved by gating color control amplifier 31 "off" during burst and "on" during the video portions of the signal while gating the automatic color control by-pass amplifier 32 "on" during burst and "off" during video. When the outputs of the amplifiers 31, 32 are combined as indicated, a wave of sub-carrier frequency is continuously applied from the oscillator 29 to the demodulators 13 and 14 both during video and during burst.

Thus, both video and burst demodulation terms are available at the demodulator outputs. Since the demodulation process is a multiplication of the input quantities, the manual color control 31 provides a manual control of the magnitude of the demodulated I and Q components while the by-pass amplifier 32, which maintains constant gain, closes the phase lock loop during the burst for stable phase lock operation.

The phase correction process of the local oscillator 29 involves the phase shifter 24, the Q demodulator 14 and in the phase lock loop per se, the gated APC amplifier and filter 30 and the voltage controlled oscillator 29. The amplifier 32 while in the phase lock loop and on during burst has little effect upon phase. Let us assume that the manual tint control 28 has been set initially to have minimum effect. When the burst pulse occurs, the phase shifter 24 is gated "on" and passes the color burst appearing in the video signal substantially without phase shift to the input of the Q demodulator 14. If the voltage controlled oscillator is momentarily out of precise phase quadrature with the burst signal, the four-quadrant multiplier 14 will generate a D.C. error signal whose signal will indicate whether the local oscillator signal is of a lesser or greater phase angle difference than precise quadrature. The magnitude of the error voltage will indicate the actual phase discrepancy. The error voltage appearing at the output of the multiplier 14 is coupled to the gated automatic phase control amplifier and filter 30. As previously pointed out, the gating is arranged to permit error sensing only during transmission of the color burst. This error signal is rectified and filtered in the block 30 and applied to the voltage controlled oscillator 29 to correct its phase to the desired quadrature relation. Assuming a locked in oscillator condition, the oscillator output will be accurately in quadrature with the burst by the end of the color burst and will hold near to this value throughout the following horizontal line. Thus, at each horizontal line the need for correction will be sensed, and then applied in a continuous fashion to the oscillator 29.

Assuming that one desires to adjust the tint of the detected signal, the means 28 are provided to adjust the detection angle in the demodulators and thus the tint. The means 28 introduces a desired phase shift in the phase shifter 24 (and 26). Since the phase shifter (24) is operative only during the period that the color burst is being passed to the demodulator, the color subcarrier is in effect phase shifted in relation to the video portion of the signal. After this phase shift has been manually introduced in 24, the demodulator 14 senses a phase error between the locally generated oscillator wave and the now phase shifted color subcarrier. A new D.C. error voltage is created which brings the local oscillator wave into quadrature with the phase shifted burst and into a new phase shifted relationship to the video portion of the signal. Thus, when the video signal is processed by the demodulators 13 and 14, the local oscillator wave is also correspondingly shifted angularly in respect to the video portions of the color signal. This phase shift effects a change in the demodulation angle in both the I and Q demodulators and adjusts the "tint" of the demodulator signal.

Assuming that the local oscillator 29 is "properly" phase locked with the color subcarrier during the burst, the selected phase relationship will continue during the video signal and the two demodulators 13 and 14 will claim I and Q color terms suitable for application to the color matrix 15, as earlier described.

In addition to manual and automatic phase control, it is desirable to maintain both an automatic and a manual control over the actual magnitude of the demodulated chrominance terms in relation to the luminance terms.

Automatic color control is provided by the gated automatic color control amplifier 36 which applies a control voltage to the AGC amplifier 21 and 23. The amplifier 36 is coupled to the output of the I demodulator and is gated to derive a gain control signal only during the burst.

During the burst, the I detector 13 has a signal applied thereto from the gated phase shifter 26 and the local oscillator wave derived from the voltage controlled oscillator 29. The two waves are nearly enough in phase, irrespective of any manual phase shifts, so that the I demodulator provides a D.C. term approximately proportional to the subcarrier amplitude. This D.C. term is stored to provide a steady D.C. value for automatic gain control purposes. This automatic gain control voltage is then fed back to control both AGC amplifiers 21 and 23.

From the above, it may be seen that the amplitude of the color demodulation terms are manually controlled by adjusting the magnitude of local oscillator injection into the I and Q demodulators while the automatic color amplitude control function is achieved by the AGC amplifier stages 24 and 26, which supply amplified chrominance to the demodulators.

Finally, in order to disable the chrominance detector when a black and white signal is being transmitted, a color killer circuit 37 is provided. The color killer circuit is thresholded and senses the output of the AGC amplifier. Accordingly, when the AGC amplifier 36 fails to provide a significant voltage, indicating that the chrominance output of the I demodulator is below the threshold set into the color killer, the color killer generates a control signal which sets the manual color control amplifier to minimum gain. When this occurs the output of the voltage control oscillator 29 to the I and Q demodulator is suppressed during video and no color demodulation occurs in either demodulator, until the threshold is exceeded. This feature improves the receiption of black and white signals as well as weak color signals.

Figure 2:
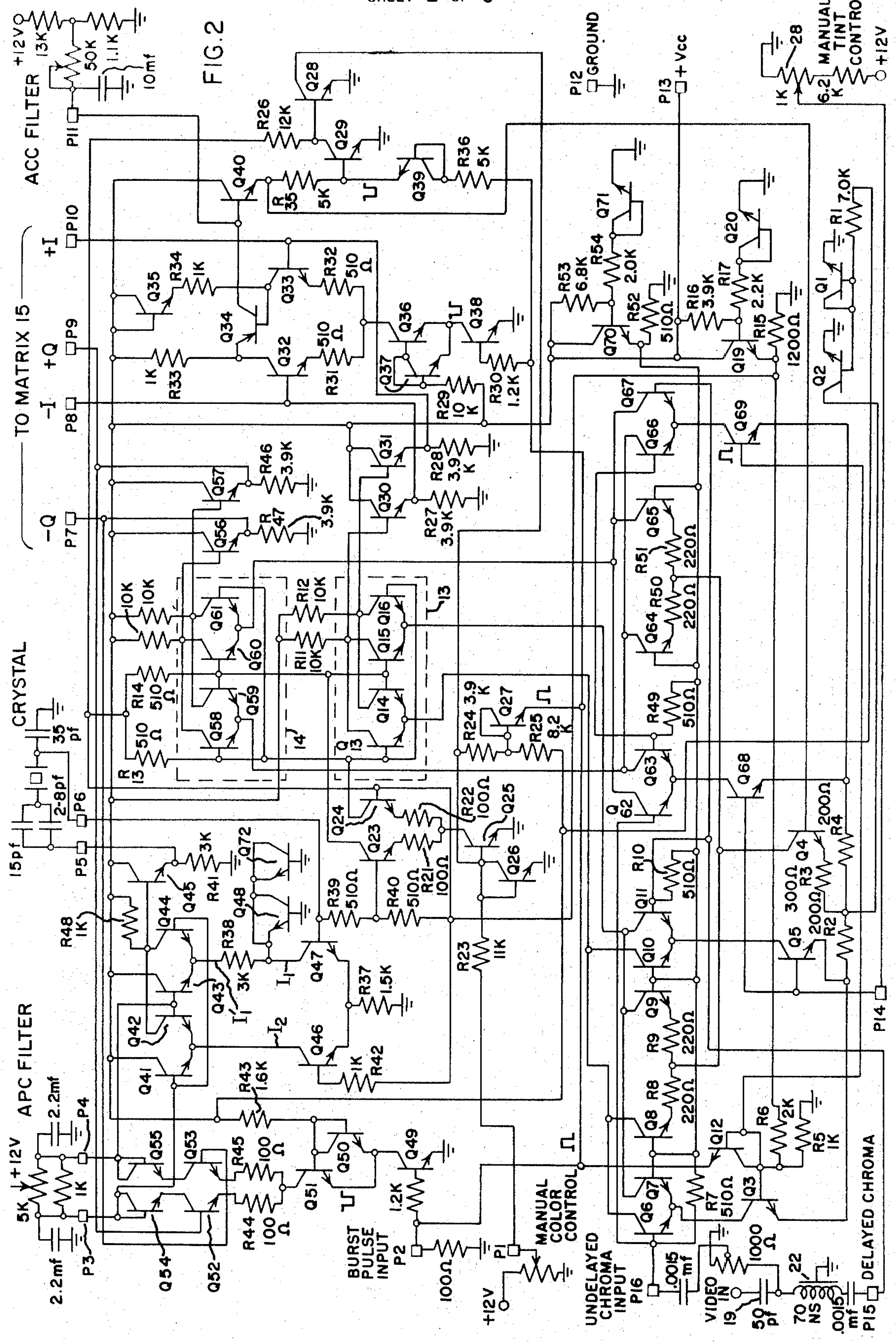
FIG. 2 is a circuit diagram of the first embodiment, physically realized as an integrated chip, which together with certain outboarded components also illustrated, performs the functions of the blocks illustrated in FIG. 1 save for those initial blocks providing the chrominance input signal to the chip and those blocks subsequent to the demodulators which form the separators R, G, B color signals from the demodulator outputs.

FIG. 2 illustrates a detailed schematic diagram of the embodiment illustrated in the block diagram of FIG. 1. In the schematic diagram, a plurality of rectangular pads are distributed about the periphery of the portion of the circuit which is fabricated on a monolithic chip. The pads, which are numbered P1 – P16 in a clockwise fashion, represent the external connection points to the chip. The pads P15, P16 are for undelayed and delayed chrominance inputs respectively and the pads P7, P8, P9 and P10 are for the I and Q demodulated chrominance output terms.

The pad P2 is used for deriving a timing signal for the gating functions. The pulse applied at this point is a delayed fly-back pulse which commences before the termination of the horizontal pulse and lasts through the time required for color burst and terminates before commencement of the video signal. This "burst" pulse establishes the time for operation of the blocks which operate in one condition during "burst" and in other condition during "video" for time shared multiplex operation.

As will be explained, the remaining terminal pads are used for control functions and for non-integrable outboarded components. Thus, the pad P1 is used for manual tint control; the pads P3 and P4 are used to introduce a potentiometer and the large capacitance required for the filter for the automatic phase control block (30); the pads P5 and P6 are used for connecting an external crystal to the VCO block (29); the pad P11 is used for the automatic color control filter requiring both a potentiometer and large value capacitances, and the pads P12 and P13 are used for the ground and bias voltage connections. For simplicity, the circuitry in FIG. 2 does not reproduce all of the input and output blocks to the chroma processor illustrated in FIG. 1, nor, as will be explained, are the functions depicted by the blocks 21 through 27 partitioned in the simplified manner suggested by FIG. 1. In respect to the chrominance input connections, the circuit in FIG. 2 commences with the high pass filter capacitor 19, omitting the prior blocks 10, 11 and 12 of FIG. 1. Thus, in FIG. 2, the chrominance input terminal is coupled through a small 50 picofarad capacitor 19 (numbered to correspond to element 19 of FIG. 1) to a resistance divider network, the tap of which is led to the undelayed chrominance input pad P16. The chrominance input is also coupled through the delay line 22 to the pad P15 for the delayed chroma input. In respect to the output for the demodulated chrominance signals, the circuit illustrated in FIG. 2 terminates short of the color matrix block 15, omitting blocks 15, 16 and 18. Thus, the pads P7, P8, P9 and P10 represent the inputs to the color matrix 15 of FIG. 1 and represent respectively the –I, –Q, +Q +I outputs of the demodulators 13 and 14.

One may now consider the demodulator input functions and their precise partitioning in the circuit of FIG. 2. The AGC amplifier function of blocks 21, 23, the delay function of block 22, the phase shifting function of blocks 24, 26 and the by-pass amplification function of blocks 25, 27 of FIG. 1 are performed by the portion of the detailed circuit involving the transistors Q1 through Q11, Q62 through Q69 and the associated circuitry. These blocks of FIG. 1 and the corresponding circuitry of FIG. 2 accept the undelayed and the delayed chrominance signal. Subject to the timing control of the burst gate pulse, they furnish the video signal for I and Q demodulation to the emitter inputs of the demodulators 13 and 14 during video. During burst, they provide the in phase and quadrature components of the burst for the demodulators 13 and 14.

As suggested by separation of the blocks 21, 24, 25 from the blocks 23, 26 and 27 in FIG. 2, the circuitry in FIG. 1 for driving emitter of demodulators 13 and 14 (save for the use of the common delay line 22 and certain common control and bias connections), is also separate. Thus, the circuitry associated with the transistors Q62 to Q69 corresponds generally to the blocks 21, 24 and 25 and drives the I demodulator 13 comprised of the transistors Q13 to Q16. The circuitry associated with the transistors Q3 to Q11 corresponds to the blocks 23, 26 and 27 and drives the Q demodulator 14 comprised of the transistors Q58 to Q61.

Let us initially consider the circuitry providing the chrominance burst to the emitter inputs to the Q multiplier 14. This input circuitry comprises three differentially connected transistor pairs: Q62, Q63; Q64, Q65; and Q66, Q67. The undelayed chrominance signal from the pad P16 is applied unbalanced to ground across the bases of the first differential transistor pair Q62, Q63. The delayed chrominance signal from the pad P15 is similarly applied across the bases of the third transistor differential pair Q66, Q67. The second or intermediate transistor pair Q64, Q65 have no interbase signal applied thereto. All six bases carry a substantial (2.5 to 5 volts) positive d.c. voltage established by a biasing network, including the transistor Q70, emitter connected resistance R52 and a voltage divider network for the base of transistor Q71. The voltage divider network is connected between the pad P13 to which the principal positive bias voltage is applied and the ground pad P12. The principal bias voltage is between 12 and 24 volts. The collectors of these three differential transistor pairs are connected into two sets, each set being connected to an emitter pair of the transistors Q58, Q59 and Q60, Q61. This connection provides the paths for application of the chrominance and burst information to the Q demodulator 14.

The chrominance and burst information applied to the bases of the three transistor diferential pairs Q62, Q63; Q64, Q65; and Q66, Q67, and in turn derived from their collectors for driving the Q demodulator, is controlled by the emitter currents supplied to these three transistor pairs. The differential output voltage of such a differential pair approximates the product of the interbase potential and the current in the paired emitters. Thus, by this multiplicative process, control of the emitter current can be used to control the amplitude of signal components appearing in the collector output circuits. In the present embodiment, emitter current control is used to provide the automatic gain control function, the phase shift action, and the time multiplexed gating suggested by the blocks 21, 24 and 25 of FIG. 2 as will now be treated in detail.

All three transistor pairs derive their emitter current from a constant current source. This source comprises the transistor Q2 having its emitter grounded and including a voltage divider for the base of Q2 comprising a resistance R1 and a diode connected transistor Q1 connected between the principal positive bias source and ground. The collector of transistor Q2 provides the point for derivation of the constant current for all three differential pairs.

The division of current from the constant current source Q2 among the three differential amplifier pairs is controlled by three base input, common emitter connected transistors Q68, Q4 and Q69 which provide tint control, automatic color control and burst gate control, respectively. These control transistors have their collectors connected respectively to the paired emitters of the separate differential amplifiers Q62, Q63; Q64, Q65; and Q66, Q67. The emitters of the control transistors are connected to the current source Q2. Thus, all current to these three differential amplifier pairs flows through the three control transistors and is subjected to control potentials applied to their bases. These bases are led to the three separate points of control specified above, as will now be described.

The tint control transistor Q68 controls the emitter current of the transistor pair Q62, Q63 in response to an external manual adjustment. The collector and emitter connections of the transistor Q68 have been set forth above. The base of the transistor Q68 is led to the pad P14 which is in turn connected to a voltage division network 28 comprising a 1K potentiometer connected in series with a 6.2K fixed resistance, the two being connected between the principal bias source and ground. Adjustment of the tint control potentiometer directly affects the amount of signal passed to the collectors of the transistor pair Q62, Q63, but as will be described below, there is an interaction with the other transistor differential pairs as a result of their joint connection to a common current source.

AGC action is achieved by the transistor Q4 whose collector is connected through a pair of emitter connected resistances to the emitters of the transistor pair Q64, Q65. The emitter of the transistor Q4 is connected through a resistance R3 to the constant current source Q2. The base of transistor Q4 is coupled to the source of the ACC voltage. Q4 and R3 may be regarded as a portion of the AGC amplifier block 21 of FIG. 2. AGC control action is achieved indirectly. Assuming an increase in current in the transistor Q4 as a result of additional ACC voltage at its base, additional current will flow through the transistor pair Q64, Q65 and be drawn from the constant current source Q2. Since the transistor differential pair Q64, Q65 are not excited by either the video or color burst, they make no direct contribution to signal transfer to the paired collector output. Instead, their effect is indirect. As the current through Q4 is increased, the amount of current available for the signal driven transistor pairs Q62, Q63; Q66, Q67, is reduced bringing about a consequent reduction in signal transferred to the multiplier 14. This interaction will be further explained below. In addition, the transistor differential pair Q64, Q65, makes up for the diminution of collector current drawn by the other transistor pairs Q62, Q63 and Q66, Q67 during AGC control so as to equalize the driving impedance as seen by the emitters of the demodulator 14.

Time multiplexed gating of the three transistor pairs is achieved through the control transistor Q69. As the other controls, transistor Q69 has its emitter coupled to the constant current source Q2, with its collector connected to the emitters of the transistor pair Q66, Q67. Transistor Q69 is connected in a base input common emitter configuration, with its base electrode connected to a voltage divider comprising the resistances R5 and R6. This voltage divider is coupled in turn across a stable voltage source comprising Q19, R15, R16, R17 and Q20. For pulse gating the base of Q69 is connected through a diode connected transistor Q12, poled to pass a positive going pulse, to the pad P2. The pad P2 is provided with an external 100 ohm resistor and is the point of application of the positive going burst gating pulse described earlier. During video, when the gating pulse is not present, the diode Q12 clamps the base of the transistor Q69 to a small positive potential, rendering Q69 nonconductive and no output signal currents are transferred through the stage Q66, Q67. During the period that a gating pulse is present, diode Q12 is blocked, and the transistor Q69 is turned on under the influence of the voltage divider R5, R6, and signal current carrying the burst is permitted to be transferred through the stage Q66, Q67.

Having considered the direct effects of the three separate control amplifiers upon the three transistor differential pairs Q62, Q63; Q64, Q65; and Q66, Q67, it is now appropriate to consider their composite effect taking into account the interaction between these controls arising from their sharing of the current from the constant current source Q2.

As initial conditions, let us assume that at the moment video is being transmitted so that the transistor pair Q66, Q67 is nonconductive. This follows since the control transistor Q69 is nonconductive except during burst. Secondly, let us arbitrarily assume that the automatic color control voltage is zero, producing a zero current flow in the central transistor pair Q64, Q65. Finally, let us assume that the tint control 28 is set at a relatively high value. Under these conditions the control amplifier Q68 will conduct, permitting current to flow into the emitters of the transistor pair Q62, Q63. In consequence of the foregoing, undelayed chroma at reference phase (and the 180° ouf of phase complement) will appear at the two collectors of this transistor pair for application to the emitters of the demodulator 14. The nonconductivity of the transistor pair Q66, Q67 combined with conductivity of the transistor pair Q62, Q63 causes the chrominance to be transferred substantially at reference phase to demodulator 14. Thus, during video, the enumerated transistors collectively perform the function attributed to the gated bypass amplifier 25 of FIG. 1.

During the succeeding burst interval, the phase of the signal applied to the demodulator input changes under manual control. During burst, the control transistor Q69 is gated "on" and the controlled transistor pair Q66, Q67 transfers the delayed burst from its bases to its output collectors. If the transistor pair Q62, Q63 is nonconductive as a result of a low initial setting of the tint control, the burst may be delayed approximately 90° and applied to the emitters of the demodulator 14 in that phase. If, however, the tint control is made more positive, so that the transistor Q68 and the transistor pair Q62, Q63 conduct substantially, the burst signal current transferred to the inputs of the multiplier 14 now becomes the vector sum of the delayed and the undelayed color burst. Since increasing the conduction of the first differential pair Q62, Q63 causes a corresponding decrease in current in the third differential pair Q66, Q67 through the action of the constant current source Q2, adjustment of the D.C. tint control produces little effect on the amplitude of the color burst applied to the demodulator input. The phase of the color burst, however, may be shifted from an intial value of approximately 90° at a minimum tint setting (and equal to the amount of the delay line 22) to a near zero value for maximum tint setting. Thus, the enumerated transistors, which during the video signal perform the by-pass amplifier function, now during burst, perform the manual phase control function attributed to the gated phase shifter of FIG. 1.

The foregoing discussion has so far hypothetically assumed the automatic control voltage to be zero. This was to imply that the control transistor Q4 was nonconductive and that no current flowed in the differential pair Q64, Q65. In fact, when any color signal is present, a positive automatic color control voltage is developed from the burst, and applied to the base of the control transistor Q4. The control voltage is larger when the burst amplitude is larger, and it is applied to the second differential pair Q64, Q65 so as to increase conduction. Due to the constant current action of the current source Q2, any increase in current in the stage Q64, Q65 brings about an equal reduction in the current available to the other two differential pairs. In consequence, the automatic color control circuit brings about a controlled reduction in amplitude of the burst and video signals applied to the input of the demodulator 14 until a desired value is approached. This desired value is standardized against the burst portion of the signal as described earlier. From the above, it may be seen that the enumerated transistor components also perform the AGC function attributed to block 21 of FIG. 1.

The circuitry which has just been described provides the chrominance and burst to the emitter inputs of the Q demodulator 14. The input circuitry for the I demodulator 13 functions in a very similar fashion. It should be noted, however, that while the control functions are the same for the I and Q input circuits, the phase relationships of the output signals are different. Thus, the manual tint control 28 connected to the pad P14 controls a tint control amplifier Q5 associated with the third transistor differential pair Q10, Q11. The transistor pair Q10, Q11 has a delayed chrominance signal and delayed burst coupled to its base (rather than the undelayed signal of Q62, Q73) and delivers a delayed signal to the demodulators 13 during video. Similarly, the gate pulse applied to the pad P2 blocks the diode connected transistor Q12, unclamping the base of the control transistor Q3 to turn it on, and turning on the first transistor pair Q6, Q7 during burst. The bases of transistor pair Q6, Q7 receive undelayed burst (rather than the delayed burst of Q66, Q67) and an undelayed burst is applied to the demodulator 13. The second differentially connected transistor pair Q8, Q9, which receive no signal excitation, derive their emitter current from the collector of the transistor Q4 in parallel with the corresponding transistor pair Q64, Q65 of the previously described Q input circuit. Thus, the AGC control action is similar as between the I and Q triads of transistor differential pairs.

During video, the by-pass amplifier function in the I input circuit produces a delayed video signal at the emitter input of the I demodulator, while the Q input circuit correspondingly produces an undelayed video signal. During burst, the phase shift function in the I input circuitry at minimum manual tint control is undelayed, and at maximum tint control it reaches a delayed condition of approximately 90° while the Q input circuitry establishes the desired phase for oscillator control. The direct AGC amplifier function of the I input circuits is meanwhile phase independent. Thus, the initial 90° phase separations achieved between the I and Q input circuitry correspond to the 90° delay function attributed to delay line 22 of FIG. 1.

Assuming that the active phase adjustments between the I and Q input circuitry, track (i.e. do not oppose one another) this initial phase differential function symbolized by the delay line 22 of FIG. 1 is retained at all times in the operating circuitry of FIG. 2. In short, the circuit components associated with the transistors Q1 – Q12 and Q62 – Q71 of FIG. 2 distributively perform the functions attributed to the individual blocks 19, 21 – 28 of FIG. 1. The description of the balance of the circuit of FIG. 1 will now be undertaken.

As indicated, the I and Q demodulators 13 and 14 function in a different role during video than during burst. During both periods a locally generated wave is supplied from local oscillator 29 and during both periods a D.C. term appears at the output of the demodulators. During video the output terms in the two demodulators are a pair of demodulated chrominance components demodulated at mutually displaced angles as required by the I and Q demodulation process. During burst, the output voltage is a measure of the phase error between the burst and the locally generated wave in the Q demodulator and a measure of the magnitude of the chrominance signal in the I demodulator.

The circuit connection to the I and Q demodulators will now be described. The I demodulator 13 comprises two differential transistor pairs Q13, Q14 and Q15, Q16. Each pair has its emitters interconnected and as previously indicated, the emitter pairs are differentially excited by input circuitry comprising the three transistor pairs Q6, Q7, Q8, Q9 and Q10, Q11. These emitter connections supply the burst and video signal to the I demodulator. The bases of the I demodulator transistors are driven in a balanced fashion by a locally generated wave obtained from the voltage controlled oscillator 29. In particular, the bases of the transistors Q13 and Q16 are joined and receive one phase of the VCO output wave and the bases of the transistors Q14 and Q15 are joined and receive the complemented phase of the VCO output wave. The D.C. levels of the bases of transistors Q13, Q14, Q15 and Q16 are established at a small positive potential by connection to the stabilized D.C. supply including the transistor Q19. The collectors of the transistors Q13 and Q15 are paired and those of the transistors Q14 and Q16 are paired. The balanced output derived from these collector pairs is applied respectively to the bases of emitter-followers Q30 and Q31. The pad P8 is coupled to the emitter of the emitter-follower Q30 and is adapted to receive one phase of the I demodulator output (−I). The emitter of the emitter-follower Q31 is coupled to the pad P10 for the complementary I demodulator output (+I). As will be further described, the emitter-followers 30, 31 also couple a demodulator output to the automatic color control circuit.

The Q demodulator 14 comprises two differential transistor pairs Q58, Q59 and Q60, Q61. Each pair has their emitters joined and as previously indicated, the emitter pairs are differentially excited by input circuitry comprising the three transistor pairs Q62, Q63, Q64, Q65, and Q66, Q67. These emitter connections supply the burst and video signal to the Q demodulator. The bases of the Q demodulator transistors are driven in a balanced fashion by a locally generated wave obtained from the local oscillator 29. In particular, the bases of the transistors Q58 and Q60 are joined and receive the complemented phase of the VCO output wave. The D.C. levels of the bases of the transistors Q58 to Q61 are established at a small slight positive potential by connecting the stabilized D.C. supply including the transistor Q19. The collectors of the transistors Q68 and Q60 are paired and those of the transistors Q59 and Q61 are paired and couple demodulated chrominance components to the bases of output emitter followers Q56 and Q57. One Q demodulator output is coupled from the emitter of the emitter follower Q56 to the pad P7 (−Q) and the complemented +Q demodulator output is coupled from the emitter of the transistor Q57 to the pad P9.

Summing up, the I demodulator output and the Q demodulator output and their complements are available at the output pads P7, P8, P9 and P10 for coupling to the following color matrix 15. The matrixing of these components and the addition of a luminance term to provide the required individual color signals for operation of a cathode ray tube have already been generally described.

Returning now to the output of the Q demodulator, the demodulation terms which appear at the output of the Q demodulator 14 during burst are used for controlling the phase of the variable frequency oscillator 29. The demodulation terms used for the phase lock loop are derived from the emitters of the emitter-followers Q56 and Q57 and applied to the gated automatic phase control amplifier and filter 30.

The APC amplifier comprises a pair of transistors Q52, Q53, connected in a differential configuration. The signal from the two outputs of the Q demodulator are applied in balanced fashion across their bases. Their emitters are each provided with a series resistance which resistances are joined and coupled to the collector of transistor Q51 which becomes the current source for the APC amplifier. The base potential of the transistor Q51 is established by a voltage divider comprising resistance 43 and a diode connected transistor Q50. The current source transistors Q51 in turn has its emitter coupled to the collector of the gate transistor Q49 whose emitter is grounded. The base of gate transistor Q49 is coupled to the pad P2 for application of the gate pulse.

Completing the main current paths through the APC amplifier, the collectors of the transistors Q52, Q53 are each separately connected to a diode connected transistors (Q54, Q55) poled to prevent reverse current in the event of large demodulation terms appearing in the APC loop. The diode connected transistors Q54, Q55 are coupled respectively to the pads P3, P4 for connection in turn to the external APC filter components and to the B+ source. The APC filter comprises a pair of filter capacitors (2.2 microfarads), one at each pad, interconnected by a fixed resistor and a potentiometer whose tap is returned to the principal bias source.

During normal operation, a phase error in the phase lock loop is indicated by a differential voltage applied between the bases of the amplifiers Q52, Q53. This error voltage is amplified in these transistors and filtered to an average D.C. value by the APC filter. The filtered error voltage is then applied to control the phase of the VCO 29. As illustrated, the error voltage is supplied in balanced fashion to the VCO oscillator by connections made to the joined collector-base electrodes of the diode connected transistors Q54, Q55 in turn coupled to the pads P3, P4.

As previously indicated, the phase control operation functions only upon sensing the burst portion of the television signal. To achieve an error voltage reflecting only the phase discrepancy between the burst and the phase of the local oscillator 29, the amplifier stages Q52, Q53 are gated "on" only during burst by the gate Q43. The presence of a gating pulse at the base of the transistor Q43 initiates current flow through the transistor Q49, the current source Q51, and through the amplifier transistors Q52, Q53. When the pulse terminates, this current is cut off. Thus, barring current flow from another source — which the diodes Q54, Q55 are designed to prevent, the error voltages which are stored in the APC filter reflect the desired phase error.

While the voltage controlled oscillator 29 may be of conventional design, that illustrated in the circuit diagram of FIG. 2 is particularly suitable. The illustrated oscillator is not itself a part of the present invention, but is the subject of a copending application of William Peil entitled "Voltage Controlled Oscillator," Ser. No. 282,443, assigned to the Assignee of the present application, and filed concurrently herewith.

The voltage controlled r.f. oscillator 29 comprises three transistor pairs Q41, Q42, Q43, Q44, and Q46, Q47 providing forward r.f. gain and arranged in a modified four-quadrant multiplier configuration, which is double balanced, an output emitter follower Q45, the resonant crystal, a phase shift network comprising R38 and the capacitance of Q47, Q48 and Q72, and sundry passive components.

The active circuit configuration providing forward r.f. gain is as follows: The transistor pairs Q41, Q42 and Q43, Q44 are arranged in an upper rank with their emitters paired. Each emitter pair (Q41, Q42, Q43, Q44) is led to the collector of a lower rank transistor (Q46, Q47, respectively). The third pair of transistors Q46, Q47 also has paired emitters, led through a common emitter resistance R13 to ground. The phase shift network comprising resistance R38 and the capacitances Q48, Q72 is coupled in the path between the collector of lower rank transistor Q47 and the upper rank pair Q43, Q44. The bases of the upper rank transistors Q41 and Q44 are joined as are the bases of upper rank transistors Q42 and Q43 for differential base excitation. The bases of upper rank transistors Q42, Q43 are then coupled to one output of the automatic phase control filter at pad P4. The bases of upper rank transistors Q41, Q44 are coupled to the other output of the automatic phase control filter at pad P3. These connections supply a filtered error signal to the bases. The collectors of transistors Q41 and Q43 are paired and directly connected to the source of high positive potentials. The collectors of transistors Q42 and Q44, which are active from the r.f. standpoint, are also paired and led through a load resistance R48 to the same positive source. This source is typically of from 12 to 18 volts.

The r.f. output from the paired collectors of Q42, Q44, which appears in load resistance R48, is coupled through emitter follower Q45 to the pad P5 leading to the external resonant circuit comprising the crystal and three capacitors. The lower rank transistor pair Q46, Q47, which provide r.f. excitation to the upper rank transistors, are also provided with differential base excitation. In particular, the base of Q47 is led to the pad P6, at the other end of the resonant circuit. The base of transistor Q46, which is not provided with r.f. excitation, is led to a source of moderate biasing potentials (4V) through resistance R14. R39 provides a similar bias connection to the base of Q47.

Double balancing action arises from the foregoing circuit provisions. Assuming that a signal voltage is applied to the base of Q47, causing an increase in the emitter current of Q47, the resistance R37 is made sufficiently large (2.2K) such that a nearly equal decrease in emitter current will occur in Q46. In consequence, the emitter current in upper rank transistor pair Q43, Q44, which is derived from the collector of lower rank transistor Q47, incurs an increase, while the emitter current in upper rank transistor pair Q41, Q42, which is derived from the collector of lower rank transistor Q46, incurs an equal or "balanced" decrease. Assuming 70 interbase voltage imbalance in the upper rank transistors, the output at the collectors of Q42, Q44 in load resistance R48 will be zero or balanced. This is one mode of balancing.

Similarly, the differential base voltage which is applied to each upper rank transistor pairs is balanced. This results from the natural constant current action in the emitter path of Q43, Q44. This upper rank pair derives its current from Q47 which forces any current decrease in Q43 to occasion a nearly equal increase in Q44. Constant current action in the emitter path of Q41, Q42 of the same nature forces any current increase in Q41 to occasion a nearly equal decrease in Q42. Summing the collector currents of Q42, Q44, and assuming that the emitter currents to each upper rank pair (Q41, Q42 and Q43, Q44) are equal, the effect of the differential base excitation of the upper rank causes a zero or balanced output in load resistance R48.

This latter balancing mode has the advantage of preventing D.C. feedthrough when the configuration is used in a direct coupled automatic phase control loop with D.C. potentials applied to the bases of the upper rank transistors. When a configuration has two such modes of balancing it is referred to as doubly balanced.

The foregoing double balancing action leads to four-quadrant multiplication when both input quanities are variable. Thus, as may be demonstrated mathematically, the output of an ideal multiplier is a vector product of the interbase potential and the differential emitter current of the upper rank transistors, the latter quanity being in turn a function of the interbase potential of the lower rank transistors. In the present configuration, which exhibits a modified form of four-quadrant multiplication, and assuming an r.f. interbase excitation applied to the lower rank transistors, a reversal in the polarity of an upper rank D.C. interbase potential from strongly positive to strongly negative will bring about a near reversal in phase of the r.f. output. The manner in which the circuit goes between these two extreme limits will now be discussed.

Consistent with four-quadrant action and assuming r.f. gain leading to oscillatory operation of the circuit, the lower rank transistors Q46, Q47 provide r.f. excitation through the emitter current supplied to the upper rank transistors. At the same time a D.C. control voltage from the APC filter 55 is applied as an interbase potential to the upper rank transistors. The polarity of the interbase potential determines whether the output r.f. current, which appears in the collector load R48, contains current primarily derived from the first branch of the circuit comprising the upper rank transistor pair Q43, Q44 and lower rank transistor Q47 (current $I_1$ in FIG. 2) or current primarily derived from the second branch of the circuit comprising upper rank transistor pair Q41, Q42 and lower rank transistor Q46 (current $I_2$ in FIG. 2). Increasing the magnitude of the interbase potential of the upper rank transistors tends to increase the magnitude of the r.f. output. Thus, since there is an effect upon both phase and amplitude of the output r.f. quantity, the operation resembles true four-quadrant multiplication.

The resemblance, however, to four-quadrant multiplication is strongly modified by the actual working circuit. In the actual circuit, the r.f. output is limited to a typically 135° variation in phase angle and to a substantially constant amplitude. These modifications flow from the provision of the phase shift network, the establishment of relatively low switching levels in the multiplier and the self-limiting effects of the lower rank circuit, and finally off resonance losses in the overall feedback circuit. These points will be undertaken after further discussion of the phase shift network.

As previously noted, the phase shift network is coupled in the first circuit branch in the connection between the collector of lower rank transistor Q47 and the paired emitters of upper rank transistors Q43, Q44. The phase shift network, which comprises the series connected resistance R38, further comprises the capacities to ground supplied by transistors Q47, Q48 and Q72. The transistors Q48 and Q72 are not used for amplification and have their collectors paralleled with the collector of Q47. Their bases are grounded and their emitters may be grounded or open or paralleled with the collector, the latter being permissible when the collector bias is less than the emitter junction breakdown voltage. For reasons to be subsequently detailed, the phase shift produced by this network is typically 45° at r.f. subcarrier frequency and produces a 3db attenuation. Thus, the r.f. current in the first branch will be delayed approximately 45°, and the amplitude attenuated to about 0.71 of its original value ($I_1'$).

The factors which reduce the amplitude variation of the r.f. output may now be treated. Assuming that the interbase potential applied to the upper rank transistors is adequate to fully switch the upper rank transistor pairs, typically 250 mv, the resultant output will be either two arbitrary current units (all $I_2$), corresponding to positive polarity switching, or 1.4 arbitrary units (all $I_1'$), corresponding to negative polarity switching. Thus, there is a nominal 30 percent variation in output amplitude between these two extremes. At zero interbase potential, assuming that switching occurs at twice the current for balance, (a desirable operating condition) the resultant r.f. output current is the sum of two vectors of magnitude 1.0 and 0.71, at 135° phase separation, or approximately 0.71 units. Thus, the phase shift network prevents the cancellation which would occur if the vectors were 180° opposed and intrinsically prevents output amplitude variation beyond those limits. The factors noted above prohibit the resultant r.f. currents from varying outside of the illustrated range.

Besides the foregoing factors restricting amplitude variation, however, there are several others. In actual operation the attenuation of the crystal tends to reduce the magnitude of the $I_1'$ and $I_2$ when the circuit is off resonance and the limit cycle of the oscillation when the loop is closed is well defined and abrupt due to the limiting action of the differential amplifier comprising Q46 and Q47. Thus, under closed loop operation the effect of the control voltage is to change phase (frequency) while holding the magnitude of the waves essentially constant.

Completing the oscillator r.f. circuit are the connections which lead from the active circuitry to the crystal resonant circuit. The crystal operates in a series resonant mode. It is provided with a pair of series connected capacitors, mutually paralleled, one fixed (15 pf) and the other (2–8 pf) adjustable, coupling the crystal at the pad P5 to the emitter follower load R41 where the r.f. signal from the upper rank transistors Q42, Q44 appears. The adjustable capacitor permits a slight retuning of the cirucit. The free terminal of the crystal is connected at the pad P6 to the base of lower rank transistor Q47 and an additional capacitor (35 pf) is coupled between this point and ground for increasing the phase shift around the "loop", as will be described. The oscillator output for the demodulators 13 and 14 is derived from the tap on the voltage divider (R39, R40), connected to the base of transistor Q47.

The foregoing voltage controlled oscillator, oscillates at a frequency which is defined to a high accuracy by the frequency of the resonant crystal, while deriving highly precise phase corrections under D.C. voltage control from the automatic phase control circuit. The frequency of oscillation may be pulled up or down from the actual resonant frequency of the crystal to the precise frequency and to the precise phase required for synchronous demodulation.

The manner in which oscillations are sustained and advanced or retarded in phase by the D.C. control voltage will now be explained. Initially, let us assume that there is no parasitic lag in the active circuitry.

Let us further assume that the transistors Q42, Q43 are conductive and that the transistors Q41, Q44 are nonconductive as a result of a positive D.C. error signal from the phase control network. Let us further assume that a small positive step voltage is applied to the base of the transistor Q47. This step voltage will bring about an increase in emitter current flow in Q47, a decrease in the emitter-base voltage of Q46, a decrease in the emitter current in transistor Q46 and a reduction in the emitter and collector current ($I_2$) in transistor Q42. In consequence, an increase in voltage appears at the collector load R48 of transistor Q42. This is coupled through the emitter follower Q45 as an in-phase, regenerative signal in resistance R16 to the resonant circuit. Thus, the circuit in branch 2 comprises transistors Q46, Q41, Q42, when turned on by a positively poled D.C. error signal tends to produce a regenerative output in response to a signal applied to the base of Q47.

Next, let us assume that the D.C. error signal voltage is of reverse or negative polarity. When this occurs a small positive voltage applied to the base of the transistor Q47 brings about an increase in emitter current in Q47, an increase in the emitter current of Q44 and a consequent increase in collector current in Q44 and a degenerative decrease in signal voltage in the load R48. Neglecting the effect of the phase shift network (comprising R38, Q47, Q48, Q72), the current in the first branch provides a degenerative signal current ($I_1$) to the resonant circuit. The phase shift network delays this current typically 45° and reduces its amplitude, as noted earlier.

Maintaining the conditions for oscillation requires that the feedback always be degenerative. The phase difference between the current in branch one and branch two is 135° at subcarrier frequency and sweeps from degeneration to regeneration. This poses the obvious danger that the circuit may be driven out of oscillation under D.C. control when the phase variation becomes degenerative. This danger is avoided by careful control of parasitic delays.

Assuming that at the exact subcarrier frequency, the resonant crystal exhibits zero reactance, the parasitic delays around the oscillator, including the forward and feedback paths, should therefore be set so that the phase swing is centered about a regenerative condition to avoid a degenerative con condition. Assuming 135° phase swing, this is provided by an additional "parasitic" delay, ideally equal to one-half the phase swing or 67½°. This delay may be produced as a result of an accumulation of delays such as the time delay (25°) attributable to capacitances associated with the output of Q42, Q44, accumulated transistor delays (10°), and finally the delay attributable to the series resistance of the crystal and the 35 pf capacitor. Normally, the last element provides a convenient means for adding delay to the extent needed.

A second consequence of the indicated parasitic phase rotation is that it avoids over pulling the crystal. The first branch output voltage has a virtual lead of 67½° and the second branch output voltage has a virtual lag 67½° from zero or regenerative phase in the ideal adjustment. Since the oscillator will resonate at the frequency where the total loop phase shift is zero degrees, corresponding to zero reactance, the crystal will be required to supply a compensatory phase shift lying within the same limits in the "pulling" process. In principle, the crystal can provide a nearly 90° inductance reactance or a nearly 90° capacitive reactance as the frequency is shifted above and below resonance. In fact, however, attaining the last few degrees is difficult since the crystal is likely to jump into another mode, and since greatly increased gain is required of the active circuitry. Thus, the present circuit limits the pulling of the crystal in the described adjustment to a point 22½° short of the 90° corresponding to pure reactance. The actual range of frequency shift depends upon the Q of the crystal. Assuming a Q of 10,000, pulling range is of the order of 1 kilohertz.

Assuming that the phase lock loop entailing the automatic phase control ampifier and filter 30 and the voltage controlled oscillator 29 are properly functioning, a properly phased r.f. output will be produced in the oscillator 29 and the demodulation process will proceed with the detection in the separate demodulators 13 and 14 of the chrominance signal occuring at the desired detection angles. Furthermore, in the phase control loop, the double balancing prevents the undesirable feedthrough of D.C. into the APC loop, preventing loop instability from this source.

As shown in the block diagram of FIG. 1 and discussed in the associated text, two additional blocks are inserted in the phase control loop. The blocks 31 and 32 are inserted between the VDO 29 and the demodulators 13 and 14 to provide respectively the manual color control function during video and the by-pass amplification function during burst. Closely associated with these blocks 31 and 32 is the "color killer" function block (37) whose operation will be taken up at the same time.

The three foregoing functions are performed in the portion of the circuit of FIG. 2 associated with transistors Q23 to Q29 and Q39. The transistors Q23 and Q24 provide the amplification function of both the blocks 31 and 32 of FIG. 1, applying the locally generated wave derived from the VCO 29 to the I and Q demodulators 13 and 14. The manual color control function utilizes the gain of Q23 and Q24 during video subjected to manual control by the potentiometer $R_m$. This potentiometer is coupled to the pad P1 controlling current supply transistor Q25 during burst, the by-pass amplification function performed by Q23 and Q24 uses current from transistor Q25 established by a voltage divider network entailing resistances R24, R25 and diode connected transistor Q26. The timing control or gating of the two amplification functions, as will be described, also entails the transistor Q27 coupled to the pad P2 for reception of the horizontal gating pulse. The color killer function entails the transistors Q28, Q29 and Q39.

Considering the actual circuit details of blocks 31, 32: the transistors Q23 and Q24 are connected in a differential amplifier configuration. The emitters of each are led through separate emitter resistances R26 and R22 to a common current supply point. The base of transistor Q24 is coupled to a source of small positive bias potentials, while the base of transistor Q23 is connected to the output voltage divider of the VDO oscillator 29. The collectors of transistors Q23 and Q24 are led through collector load resistances (R13, R14) to a source of a small positive bias potential (5–10 volts). The locally generated wave at subcarrier frequency from VCO 29 is applied to the bases of the transistors Q23 and Q24, and appears at the collectors of these transistors in push-pull. The amplified wave is applied to the bases of all eight transistors in the demodulators 13 and 14. In particular, the collector of transistor Q24 is connected with the bases of transistors Q58, Q61, Q13, Q16, while the collector of Q23 is connected to the bases of Q59, Q60 and Q14, Q15 of the I and Q demodulators.

The foregoing amplifier configuration is subject to the three modes of control indicated above by the current control transistor Q25. The collector of Q25 is connected to supply current to the emitter resistances R21 and R22 of the differential amplifier Q23, Q24. The emitter of current control transistor Q25 is grounded and the base of Q25 is the point at which controls are applied.

Two of the connections affecting the base potential of control transistor Q25 are as follows: The base of Q25 is connected through resistance R23 to the pad P1, and thence to a tap on the outboarded manual color potentiometer $R_m$ coupled between a large positive bias source and ground. A second connection to the base of Q25 entails a diode connected transistor Q26, R24 and R25, which tend to establish a substantial forward bias in control transistor Q25 and in turn to establish a desired fixed level of amplification in the transistors Q23 and Q24. A diode connected transistor Q27, coupled between the junction of R24 and R25 and the gate pulse pad P2, is poled to clamp the connection point between R24 and R25 to ground in the basence of a gate pulse and to become nonconductive when the gate pulse is applied to P2.

The third connection to the base of Q25 entails the transistors Q28, Q29 and Q39 which perform the color killer function. The automatic color killer senses the D.C. voltage developed in the automatic color control amplifier (block 36, FIG. 1) at the base of transistor Q29. Transistor Q29 has its emitter grounded and its collector connected through load resistance R26 to a source of small positive bias potentials. Its collector is also connected to the base of transistor Q28 whose emitter is also grounded and whose collector is connected to the base of transistor Q25. The base of input transistor Q29 is also coupled to the gate pulse pad P2 through serially connected resistance R36 and diode connected transistor Q39, poled to conduct the gating pulse.

The foregoing control circuit for Q25 functions in the following manner. Assuming that color is present in the signal and that video is being transmitted at the moment of consideration, the color killer, which acts through Q28, is inoperative, and transistor Q27 which clamps the voltage divider R24 and R25 to ground through the pad P7 prevents application of the forward bias that R24 and R25 would normally provide to Q25. These circuit elements tend to hold the base of Q25 at a diode drop above ground potential and at an indeterminate current level. Under these conditions, the manual color control potentiometer is operative and takes over control of the current setting of Q25. Depending upon the setting of the tap of the color control, typically between 0 and 8 volts, the emitter base voltage of Q25 may be varied so as to either reduce the current flow in transistor Q25 to cut off or to increase it to saturation. This control of current in Q25 in turn controls the emitter currents in Q23 and Q24 and in turn the amplitude of the local oscillator voltage injected into the demodulators 13 and 14. As has been previously explained, the demodulator process is a multiplication process making the amplitude of the demodulated chrominance signal larger or smaller in relation to the luminance signal function of the amplitude of the injected local oscillator voltage. Thus, adjustment of the color control potentiometer, which controls the VFO injection, controls the intensity of the demodulated chrominance signal.

The foregoing manual adjustment operates only during the video portions of the signal and only when the color killer is inactive. During burst, the diode Q27, which previously clamped the biasing network R24, R25 to near ground potential, is blocked. This allows the voltage in the voltage divider to climb causing the base of transistor Q25 to assume a predetermined, fixed forward bias. The manual control does not interact appreciably because of the relatively high impedance of R23 and its lower bias voltage than that coupled to R24, R25. During the burst interval, the emitter current flow and the consequent gain of the differential amplifiers Q23 and Q24 is set at a relatively high, constant value determined by the resistances R24 and R25 and diode Q26. The diode clamping thus allows the circuit to operate with controllable gain during the video portions of the signal and with fixed gain during burst. In the context of the phase control loop, operative during burst, the feedback loop is closed in a constant gain mode for accuracy in the phase control process.

Finally, when the signal being processed is black and white, the color killer comes into play. When a signal is present which exceeds the threshold of the input circuit to the transistor Q29, the transistor Q29 becomes strongly conductive, earthing the base of transistor Q28 and cutting it off. During this condition, the color killer circuit has no effect on transistor Q25. If, however, the ACC amplifier voltage falls below the threshold required to turn transistor Q29 on, then the base potential of Q28 rises under the influence of the bias connected resistance R26. This connection causes Q28 to saturate and to effectively clamp the base of control transistor Q25 to ground. When transistor Q25 is turned off, the emitter current in Q23 and Q24 is also turned off preventing any further injection of local oscillator voltage into the multipliers 13 and 14. This brings the color demodulation process to a stop. The color killer circuit is designed to work only during video. During burst, the diode Q39 couples the burst pulse to Q29 causing it to become conductive and to disable the color killer. This feature permits the circuit to keep testing for the chrominance level in the video transmission and to return the chrominance demodulators to operation when the color killer threshold is exceeded.

The transistors Q30, Q31 which couple the complementary I demodulation products to the output pads P8 and P10 are coupled to the input of the gated automatic color control circuit (block 36 of FIG. 1). The automatic color control circuit derives a D.C. voltage proportional to the burst appearing in the output of the I demodulator, amplifies and filters it, and applies the filtered D.C. voltage to the AGC amplifiers (blocks 21 and 23 of FIG. 1). The effect of this feedback connection is to hold the chrominance signal and the burst at a constant amplitude standardized by the burst at the amplifier inputs. The functioning of the automatic color control feedback loop as a whole was outlined in the description of FIG. 1.

The function of block 36 of FIG. 1 in the ACC feedback loop is performed in FIG. 2 by the circuit comprising transistors Q32 through Q40 and an outboarded color control filter circuit coupled to the pad P11. The amplifier function is performed by a pair of differentially connected transistors Q32, Q33 aided by amplifier Q34 and an output emitter follower Q40. Gating and current level controls are provided by transistors Q35 through Q39.

Considering the foregoing circuit in detail: The transistors Q32 and Q33 have separate emitter resistances R31 and R32 which are joined and led to the collector of transistor Q36 which functions as a constant current source. The current level of the constant current source Q36 is established in turn by a base voltage supply circuit comprising a resistance R29 and a diode connected transistor Q37. The resistance is connected to a source of high positive potentials while the diode connected transistor Q37 is connected in shunt with the input junction of the transistor Q36. The emitter of Q36 is connected to the collector of Q38 which functions as an input gate for the amplifier. Q38 has its emitter grounded and its base connected through a resistance R30 to the pad P2 to which the delayed burst pulse is applied. As previously noted, the bases of the transistors Q32 and Q33 are led to the emitters of Q30, Q31, respectively, for application of the complemented I demodulation products. The collector of Q32 is led through a load resistance R33 to a positive bias source while the collector of transistor Q33 is led through a second resistance R34 in series with a diode connected transistor Q35 to the same positive bias source. The amplified output of the transistors Q32, Q33 is applied between the emitter and base of the amplifier transistor Q34, whose collector is led to the base of ACC output emitter follower Q40. The base of Q40 is also led to the pad P11 to which the external ACC filter is connected.

The ACC filter comprises a relatively large (10 mf) filter capacitor whose time constant is adjusted by means of a 50K variable resistance. The normal D.C. level of the base of Q40 is established by a voltage divider network c connected between a source of positive bias and ground. The filtered ACC voltage is then applied to the base of transistor Q40 and ACC output for the application to the AGC amplifiers is derived from the emitter of Q40. The emitter of Q40 is led through load resistance R35 and through the input junction of transistor Q29 to ground as earlier described.

Considering the operation of the above circuit: amplifier Q32, Q33 operates at a current level established by the current source comprising transistors Q36, Q37 and resistance R29, during the periods that the gate Q38 allows current flow. The base of Q38, being at ground potential by connection to the pad P2, holds the gate transistor Q38 at cut-off during video. During burst, the pad P2 provides a positive going pulse which drives transistor Q38 into conduction and activates the current source, energizing the amplifier Q32, Q33. By this means, the amplifier develops an output signal only during burst. The output of the amplifier Q32, Q33 is applied to the input of transistor Q34 which amplifies the signal and applies the amplified signal to the ACC filter connected to pad P11. The initial input bias for the transistor Q34 is established at one diode drop by the diode connected transistor Q35 which is connected in the path between the load resistance of Q33 and the source of positive bias potentials. The ACC filter and the output emitter follower Q40 operate conventionally. They couple the filtered ACC voltage and apply it from the emitter Q40 to the base of the transistor Q4, which establishes the gain of the AGC input stages as earlier described.

Figure 3:
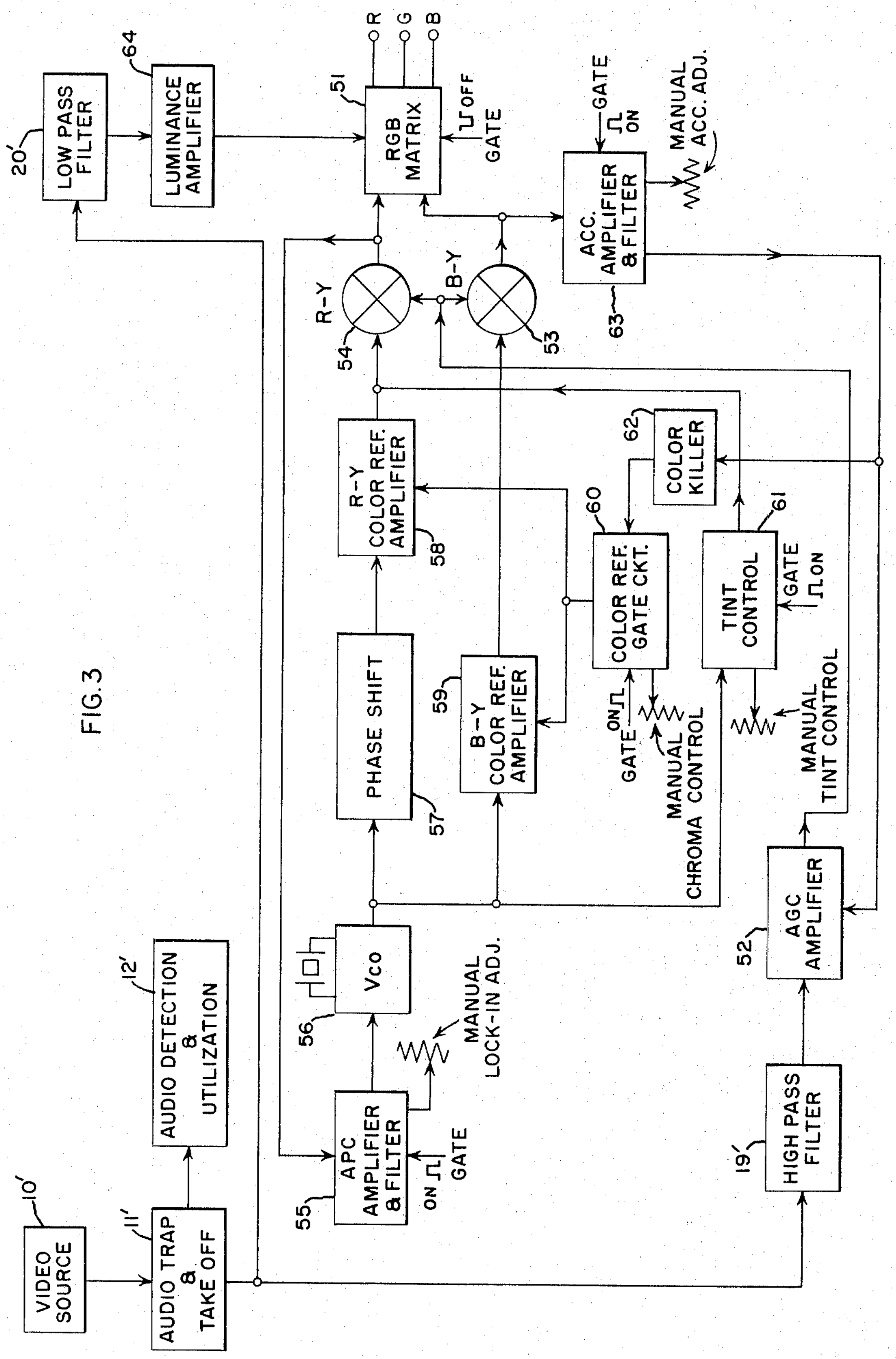
FIG. 3 is a block diagram illustrating the overall organization of a second embodiment of the multiplex color television demodulator.
Figure 4A:
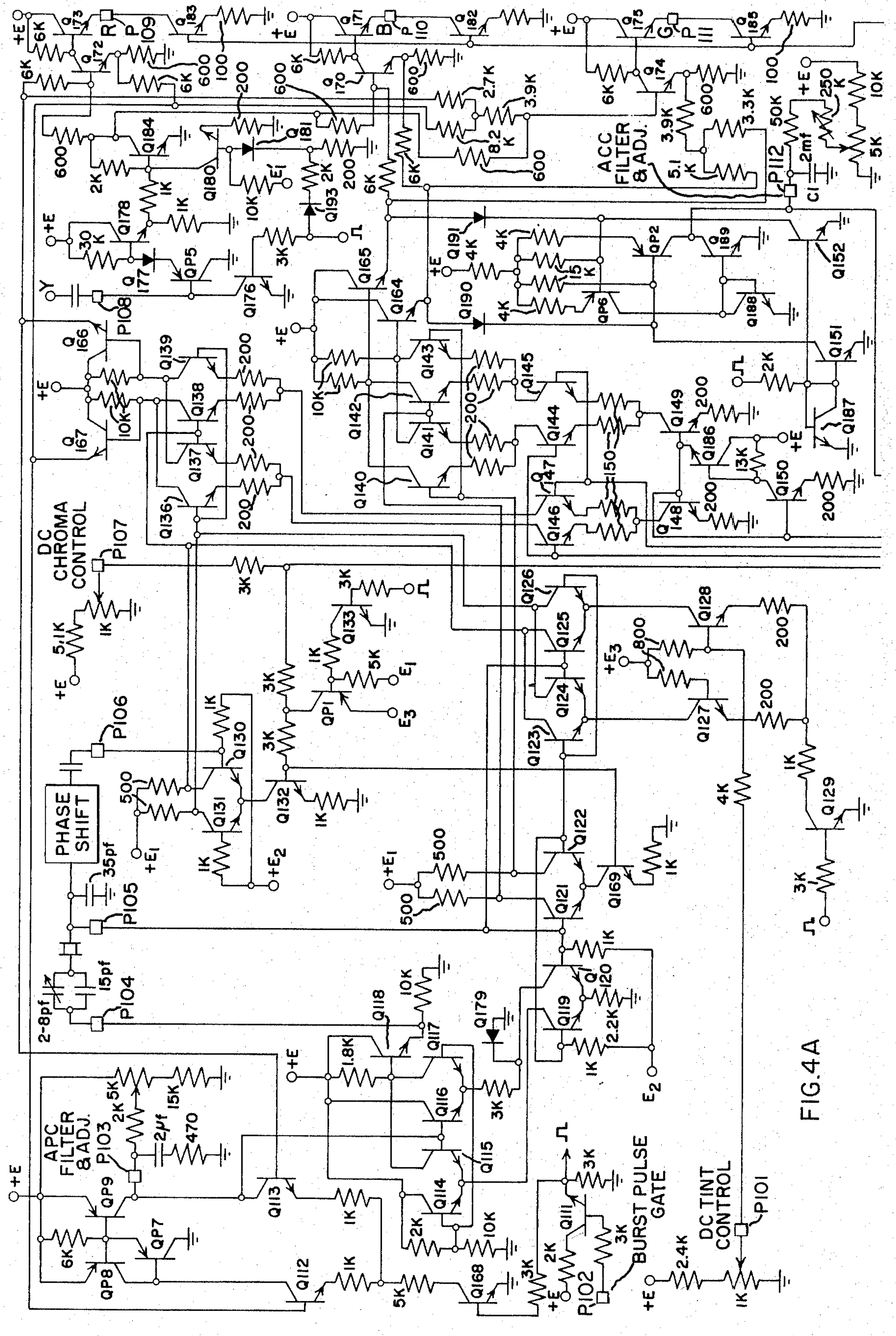
FIGS. 4*a* and 4*b* which together form a single circuit diagram of the second embodiment also physically realized as an integrated chip. The chip together with certain outboarded components (also illustrated) performs the function of the block diagram illustrated in FIG. 3 save for the initial blocks supplying chrominance to the chip.
Figure 4B:
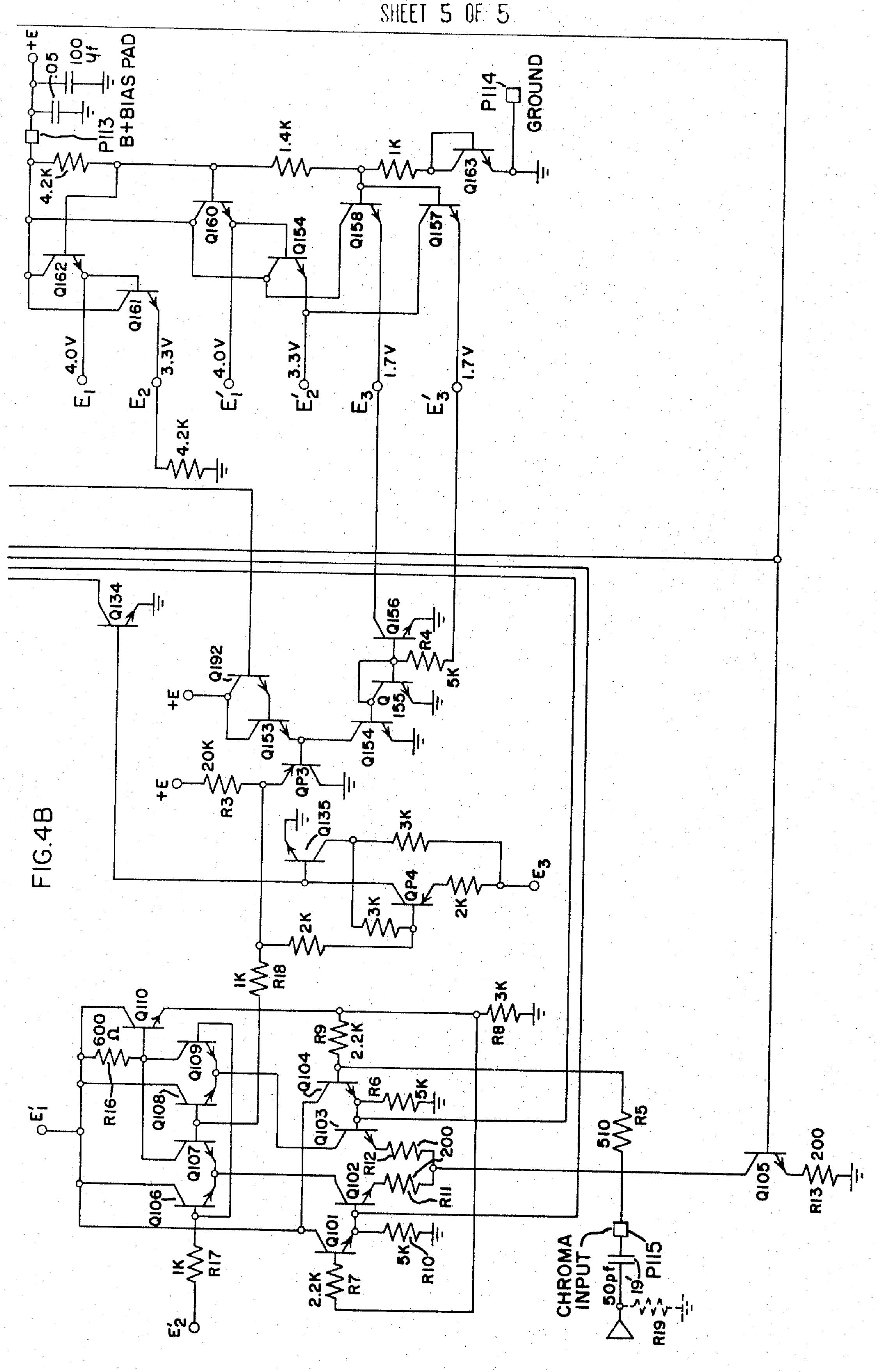

A first embodiment of the invention has been described with reference to FIGS. 1 and 2. FIGS. 3, 4a and 4b relate to a second embodiment. The second embodiment differs from the first in the manner in which demodulation at approximately orthogonal angles is achieved. In the first embodiment, the chrominance signal is formed into two separate signals, one delayed with respect to the other. These signals are fed to the separate demodulators 13 and 14 and both are multiplied by a locally generated wave supplied in the same phase. In the second embodiment now to be described, the chrominance signal is fed to both demodulators in the same phase and the locally generated wave, which is multiplied with the chrominance signal in the demodulators is separated into two mutually delayed waves. In addition to this change, there are also several circuit modifications, including in particular changes in the automatic color control circuit. This circuit is the subject of a separate application filed in the name of William Peil et al., Ser. No. 282,451, entitled "Amplifier of Controllable Gain," assigned to the Assignee of the present application, and filed concurrently herewith.

The color television demodulator of FIG. 3 comprises a video source 10′, an audio trap and take-off 11′, an audio detection and utilization block 12′, a high pass filter 19′, which couples the chrominance signal to the input of the multiplexed chrominance demodulator, a low pass filter 20′, which couples the luminance signal through luminance amplifier 64 to the RGB matrix 51. The chrominance signal is coupled from the high pass filter 19′ to the automatic gain control amplifier 52 which supplies the chrominance signal to the inputs of the B – Y and R – Y demodulators 53 and 54, respectively. As will be seen, the automatic gain control amplifier 52 amplifies both color difference signals and burst to a desired value under the control of an automatic color control voltage. This color voltage is designed to stabilize the output signal by regulation on the amplitude of the burst as in the first embodiment, and in such a manner as to reflect a manual color setting.

Assuming suitable subcarrier injection, the demodulator 54 produces an R – Y output signal (and the complement) which is coupled to one pair of inputs to the RGB matrix 51. Similarly, demodulator 55 derives a B–Y signal (and the complement), which is coupled to another pair of inputs to the RGB matrix. The RGB matrix also receives the Y signal after amplification in 64 through the low pass filter 20′, and subject to a gating control which blanks the luminance amplifier 64 during burst, produces the individual RGB color signals. Before application the color inputs of a cathode ray tube, additional amplification of the color signals off the chip is usually required.

In addition to supplying the video output signal, the outputs of the R–Y and the B–Y demodulators, respectively, are used in the automatic phase control loop for control of the local oscillator and for deriving a signal useful for automatic color control.

Considering now the automatic phase control loop: the output of demodulator 54 is coupled to an automatic phase control amplifier 55 which is gated to permit error signal formation only during burst. The D.C. voltage which is developed from samples taken during burst is filtered and stored continuously. The sign of this D.C. voltage and its magnitude indicates the direction and the amount of phase error in the locally derived waves. At the modulator output, the D.C. differential voltage is minimum when the applied waves are in quadrature. The phase control voltage is then applied to the voltage controlled oscillator 56 so that the locally generated waves will be brought into the desired phase relationship for the demodulation process.

The output of the voltage controlled oscillator 56 pursues three paths to the demodulators. In the first path (to the R – Y demodulator 54), the oscillator output is supplied to a phase shift network 57 which brings about a fixed phase shift typically within the range of from 70° to 90°. The phase shifted signal is then applied to a color reference amplifier 58 whose output, subject to certain controls, is supplied to the demodulator 54. During burst, the color reference amplifier 58 operates at full gain. In the second path (to R – Y demodulator 54), the undelayed wave from the voltage controlled oscillator 56 is applied to the tint control 61. The tint control applies the undelayed or the complement in controlled amounts to the input of the demodulator 54. The tint control is subject to manual control and is gated to function only during burst. The waveform from the VDO 56 to the demodulator 54 is thus, during burst, the resultant of the phase shifted output from the color reference amplifier 58 and from the tint control 61. The resultant is at the phase desired for R – Y demodulation. In the third path (to the B – Y demodulator 53), the undelayed wave from the voltage controlled oscillator 56 is applied with phase inversion to the second color reference amplifier 59. The output of amplifier 59, also subject to control by the color reference gate circuit 60, is supplied to the modulator 53 at the phase desired by B – Y demodulation.

Both color reference amplifiers 58 and 59 are subject to control by a color reference gate circuit 60. The color reference gate circuit has provisions for application of the burst pulse and a manual D.C. adjustment for the chrominance or tint control and, finally, an input from the color killer 62. During the burst pulse, the gate circuit 60 establishes full gain operation for the color reference amplifiers 58 and 59 so as to properly close the phase lock loop coupling the oscillator 56 with the demodulators 54. During video, the manual chrominance control is operative to adjust the amount of subcarrier injection into the demodulators 53 and 54 in order to regulate the magnitude of the demodulated R – Y and B – Y signals. The third control exerted by the color reference gate circuit is derived from a color killer 62 which senses the ACC voltage and upon its falling below a prescribed threshold turns off the color reference amplifiers 58 and 59 during video. The color killer remains operative during burst to sense the magnitude of the burst so that color operation is restored whenever the initial threshold is exceeded.

Considering the operation of the phase lock loop in this second embodiment, the loop derives its error signal during burst as in the first embodiment. As noted above, the tint control produces a phase shift based on mixing the delayed VCO output with the undelayed VCO output and its complement. In effect, the resultant can be held to a relatively constant amplitude whose phase shifts from plus to minus 45° from the desired reference detection angle. During video, however, the VCO is held to its previous phase condition established during burst by the stored D.C. voltage which is developed in the automatic phase control filter, and the detection angles in both modulators is determined by that voltage.

The automatic color control loop functions in many respects similar to that of the first embodiment. This loop derives a control signal during burst when the color reference amplifier 59 is operating at full gain under the control of the color reference gate circuit 60. The burst and the VCO input to the B – Y demodulator 53 are nearly in the same phase, usually differing by less than 20°, making the amplitude of the product term derived by the demodulator, which is a cosine function, relatively insensitive to small angular changes between them. The control signal from the demodulator is applied to the gated ACC D.C. amplifier 63. The ACC D.C. amplifier is gated at its input to derive a control signal only during burst. The gain of the ACC amplifier in its production of a D.C. control signal is adjusted by an external potentiometer. Manual color control, however, is provided by controlling the oscillator injection into both demodulators as noted above. The automatic color control voltage from 63 is applied to the novel AGC amplifier 52 to hold the gain of the chroma injected in the demodulators 53 and 54 at the desired level.

The ACC amplifier and filter 63 of FIG. 3 is illustrated in greater detail in the circuit diagram of FIGS. 4a and 4B. The ACC amplifier and filter 63 is coupled to the emitter followers Q164 and Q165 for deriving a sample of the complemented B – Y demodulator outputs during burst. The output of the amplifier portion of 55 is coupled to the external ACC filter at the pad P112 and the filtered output is coupled through a load isolation network comprising transistors QP3, Q153, Q192, Q154 and Q155 to the AGC amplifier 52. Gating within amplifier 63 permits multiplier output sensing only during burst and a noise balancing configuration provides a high degree of noise immunity to the ACC circuit.

Considering the circuit details of the amplifier 63: the transistors QP2, QP6, Q187, Q188, Q189, Q151, Q152, diodes Q190 and Q191, and sundry resistances make up the circuit components of the gate and amplifier proper. The emitter of Q164 couples demodulated burst through isolation diode Q190 to the base of transistor QP2, while the emitter of Q165 couples the complemented demodulated burst through isolation diode Q191 to the base of QP6.

The isolation diodes Q190, Q191 provide the gating action. They are controlled to admit signal currents only during burst by a gating circuit which entails a 2K ohm resistor which is coupled to a source of positive going burst pulses (transistor Q111), a diode connected transistor Q187, which provides a (Veb) current reference, and transistors Q151, Q152 whose current is set by this current reference. The isolation diode Q190 derives its current through the collector of Q151 while the diode Q191 derives its current through the collector of transistor Q152. During burst, the transistors Q151 and Q152 are turned on by the burst pulse, allowing signal current to flow through isolation diodes Q190 and Q191 and samples of the demodulated burst to be coupled to the bases of transistors QP6 and QP2.

The transistors QP2, QP6 and Q189 provide the amplification function in 63. Transistors QP2 and QP6 are biased by suitable resistances coupled to their bases and to their emitters including a common emitter resistance connected to a source of positive bias potential for differential amplifier operation. The collector of QP2 is connected to the pad P112 which leads to the ACC filter. The collector of QP6 is connected through diode connected transistor Q188 to ground and to the base of Q189. The diode Q188 furnishes a Veb current control for NPN transistor Q189 matching its current to that of QP6. The collector of Q189 is also connected to the pad P112, thus combining the output of both QP2 and Q189 in push-pull across the ACC amplifier load.

The "burst," which in the demodulator outputs forms a complemented D.C. signal at the output of Q164, Q165, is amplified by the differential pair QP2, QP6 to form a D.C. control signal, and applied in push-pull by QP2, Q189 to the ACC load at pad P112. If the signal polarity makes the base of transistor QP6 more positive than the base of QP2, transistor QP6 becomes less conductive, as well as transistor Q189. At the same time, a complementary negative potential is applied at the base of PNP transistor QP2 increasing its conductivity. The complementary transistors QP2 and Q189 are serially connected between the positive bias source and ground and the ACC load is coupled at their paired collectors. Thus, increased conductivity in QP2 is accompanied by decreased conductivity in Q189, bringing about an increase in D.C. potential available at the pad P112 corresponding to push-pull operation.

The circuit is normally operated with an input signal phase relationship that brings about a positive output at the pad P112 in response to the burst. The potentiometer P1 determines the D.C. gain of the amplifier 63 and thereby the amount of control potential produced for a given amount of burst in the detector output.

"Noise" in the demodulator outputs, which is balanced to ground in both signal paths, is normally self-cancelling. This is readily shown by noting that if both transistors QP2 and QP6 share a D.C. offset of the same polarity (as from noise), a conductivity in one (for instance QP2) will increase while conductivity in the other (QP6) and Q189 which is made equal to QP6, will incur a corresponding increase, producing little or no net change in output voltage. In addition to this common mode noise cancelling, the filter capacitor averages to zero any high frequency noise components appearing during the burst interval.

The output of the ACC amplifier 63 is applied at P112 to the filter and control elements. The filter of the ACC amplifier 63 comprises the non-integrable elements including a 2 mf storage capacitor C1 and a pair of potentiometers of 250 K and 5 K mentioned earlier and a pair of fixed resistances of 50K and 10K. The capacitor C1 is coupled between the pad P112 and ground. The 50K resistance is provided connected in series with the 250K potentiometer between the pad P112 and a tap on the 5K potentiometer. The 5K potentiometer is in turn connected in series with the 10K resistance and a 12 volt source of bias potential. The 250 K ohm potentiometer, which constitutes a variable amplifier load resistance and thereby a direct control of its gain, permits one to adjust the output level of the ACC circuit in relation to a given burst level in the detector output.

The 5K potentiometer permits one to adjust the signal threshold at which the color killer 62 operates. The color killer itself has a "fixed" D.C. threshold. However, a variation in the position of the tap adjusts the amount of D.C. added to the demodulated D.C. potential derived from the burst. Thus, as one varies the D.C. added by adjusting the 5K potentiometer, the burst derived voltage required to exceed the fixed threshold is correspondingly varied.

After filtering, the ACC voltage from 63 is coupled to the color killer 62 and AGC amplifier 52 through an impedance isolation network comprising the transistors QP3, Q153, Q192, Q154, Q155 and resistances R3 and R4. The filtered ACC control signal at pad P112 is coupled to the base of emitter follower Q192, the input transistor of the isolation network. The collector of Q152 is coupled to B+ and its emitter is coupled to the base of transistor Q153. Q153 is also in an emitter following configuration with its collector connected to B+ and its emitter led to the collector of transistor Q154 acting as a constant current source. The emitter of Q154 is grounded and its base coupled to a $V_{(EB)}$ reference potential established by R4 and diode connected Q155, the two being coupled between a low bias source (+1.7V) and ground. The output of the impedance isolation network appears at the emitter of PNP transistor QP3, also connected in emitter follower configuration. The base of QP3 is connected to the emitter of Q153. The collector of QP3 is grounded, and its emitter is led through load resistance R3 to the high positive bias source (+12V).

The impedance isolating network thus uses three successive emitter following stages and couples the filtered ACC voltage from the pad P112 to the color killer 62 and to the AGC amplifier 52, whose detailed circuit will now be described.

The AGC amplifier 52 comprises the circuitry associated with the transistrs Q101 through Q110. Summarizing: the transistors are connected in a modified four-quadrant multiplier configuration with lower and upper ranks of transistors. The lower rank transistors Q101 to Q104 drive the upper rank transistors Q106 through Q109 through collector to emitter connections. The chrominance and burst input from the chrominance source is applied to the base of one lower rank transistor Q104. The output of the upper rank transistors (Q106 through Q109), dependent upon the magnitude of the automatic color control voltage, is applied as either regenerative or degenerative feedback through output emitter follower transistor Q110 to the lower rank transistors to effect gain control. The normal range of gain is from +9 db to −6 db. The amplitude stabilized chrominance and burst output 52 is derived from the emitter loads of lower rank input transistors Q104 and Q101.

Considering the AGC amplifier circuit configuration in detail: the chrominance and burst input signal from the chrominance source is coupled through capacitor 19′, acting as a high pass filter to the chrominance input pad P115. The source has a nominal internal resistance of 51 ohms as shown by the dashed resistance R19. The chrominance input pad P115 is connected through input resistance R5 to the base of lower rank transistor Q104.

Flanking lower rank transistors Q104, Q101 drive inner transistor pair Q103, Q102, respectively. Lower rank transistor Q104 is connected in an emitter follower configuration with its collector led to a low (4.0 volt) positive bias potential and its emitter is led to ground through load resistance R6. Lower rank transistor Q101, also connected in emitter follower configuration, is not coupled for direct receipt of the input signal but does receive a feedback signal containing chrominance and burst information as will be described. Transistor Q101 has its collector connected to a source of low (4.0 volts) positive bias potential, its emitter led to ground through resistances R10, and its base connected through a resistance R7 to one terminal of feedback load resistance R8. The other terminal of R8 is grounded. The base of transistor Q104 is also connected through resistance R9 to the ungrounded terminal on feedback resistance R8. The emitters of Q104 and Q101 are then connected to the bases of Q103, Q102 for signal coupling thereto.

Paired lower rank transistors Q102 and Q103 form a differential amplifier to whose bases an input signal from emitter followers Q101 and Q104 is applied as noted, and whose collectors in turn apply an output signal to the emitters of the upper rank transistors. Each transistor Q102, Q103 has an emitter resistance R11, R12, respectively, coupled to the collector of constant current source Q105. Q105 has its emitter returned to ground through resistance R13 and its base connected to a stable voltage source comprising transistors Q186, Q150 and resistances of 200 and 12 K ohms. The connection of the emitters of Q102 and Q103 to the current source causes formation in Q102 of an out of phase signal current equalling that applied to Q103 (and the converse is also true). The collectors of transistors Q102 and Q103 are coupled respectively to the emitters of upper rank transistors Q106, Q107 and Q108, Q109, respectively, for signal application.

The upper rank transistors which have chrominance and burst coupled to their emitters, as noted above, produce an output at the upper rank collectors which reflects the automatic color control voltage applied to their bases. The collectors of upper rank transistors Q106 and Q108 from which no output is derived, are joined and led to the 4 volt source of fixed positive bias. The collectors of upper rank transistors Q107 and Q109 from which an output is selectively derived, are also joined and led through load resistance R16 to the same 4 volt source of positive bias potentials. The bases of transistors Q106 and Q109 are paired and led to a stable 3.3. volt reference source through the resistance R17. The bases of transistors Q107 and Q108 are coupled through resistance R18 to the emitter of PNP transistor QP3 from which the automatic color control voltage is supplied. Thus, the base excitation is poled for balanced operation at the output collectors.

The automatic color control voltage distributes the signal between one upper rank transistor pair and the other in a continuous fashion. The control voltage is applied with the 3.3 volt reference source in a "balanced" fashion to the bases of Q106, Q109. The ACC voltage varies continuously from a value typically 150 millivolts below the 3.3 volts reference source to a value typically 150 millivolts above the reference source. Assuming that the ACC voltage is sufficiently less positive than the reference to cut off Q107, Q108, then Q106, Q109 will be turned on. Since the signal output is derivable only from Q107, Q108, the effect of this low or less positive interbase potential is to switch the output signal to the path through Q109. Similarly, when the ACC voltage is higher or more positive than the reference, the signal path is through Q107. Since the voltage may vary continuously between the upper and lower limits, the output signal may also be continuously varied from a condition in which the signal is all in one path, to a condition in which it is partly in one path and partly in the other path, to a final condition in which it is all in the other path.

The foregoing configuration functions in a mode resembling four-quadrant action. Assuming that the base of lower rank transistor Q104 is excited with the input chrominance and burst signal, an out of phase signal will appear at the collector of Q103 while a complemented (in phase) signal voltage will appear at the collector of lower rank transistor Q102. Thus, the paired emitters of upper rank transistors Q106, Q107 and Q108, Q109 will be differentially excited with in and out of phase chrominance and burst. When the ACC voltage applied to the bases of upper rank transistors Q107 and Q108 become less positive than the fixed bias voltage on the bases of Q106 and Q109, turning on the output transistor Q109, an increase in out of phase signal voltages will appear in the output load resistance R16. Conversely, if the automatic color control voltage exceeds the fixed 3.3 volt bias, the output transistors Q107 will be turned on causing an increase in in phase signal voltages to appear in the output load resistance R16. Since the signal voltages derived in the collector load resistance R16 are opposite in phase as between output transistors Q107 and Q109, the magnitude and phase of the resultant output signal voltage of upper rank transistors will change — dependent on the ACC bias, and if applied as feedback to the base of Q104, the effect will vary from regeneration to degeneration.

The output of the upper rank transistors of the AGC amplifier is connected to the input of both lower rank transistors to provide such feedback. The collector load resistance R16 is connected to the base of output emitter follower Q110, whose collector is connected to 4.0 volt positive potential and whose emitter is led to feedback load resistance R8. This connection provides both A.C. and D.C. feedback paths from the output load of the upper rank transistors to both flanking lower rank input transistors.

The feedback circuit provides control of the A.C. gain of the amplifier with an essentially zero effect upon the D.C. gain. This relationship is achieved by an input circuit balanced for D.C. feedback (so that the feedback is self-cancelling) and unbalanced for A.C. feedback. As previously noted, the pad P115, the chrominance input point, is coupled through a 50 picofarad capacitor 51 to a low impedance source illustrated by dotted virtual resistance R19. The impedance of R19 is normally about 50 ohms as illustrated. A 510 ohm resistance (R5) connects the pad P115 to the base of Q104.

For D.C. feedback, the feedback voltage appearing in the feedback load resistance R8 is led to the bases of Q101 and Q104 through equal 2.2K resistances. The capacitor 51 presents an infinite impedance to the low source impedance coupled to the base of Q104, and no D.C. impedance imbalance results. Thus, for D.C., under all interbase adjustments, the feedback at Q101 and Q104 will produce equal "common mode" output signal voltages in the output loads R10 and R6 of the AGC amplifier, i.e., both will be in the same polarity and magnitude with respect to ground. The capacitor 51 prevents any external D.C. signal from affecting this condition. Noting that the output of the AGC amplifier is derived differentially between the bases of Q102, Q103, the "common mode" feedback signal is thus rejected or self-cancelling. In short, the D.C. gain (within the amplifier) is substantially unaffected by the feedback provisions (and is essentially unity).

For A.C. feedback, however, particularly at the color subcarrier frequency, the base of Q104 is in a lower impedance configuration than Q101 and thus receives less feedback voltage. In particular, the external source impedance R19 appears as a near short circuit, while the rest of the input connected to Q104 appears as a 510 ohm resistance with an approximately 1,000 ohm capacitive reactance (at subcarrier frequency) shunting the base to ground. These elements, depending upon other parameters of the amplifier provide an impedance at the base of Q104 that is at times appreciably lower and never greater than at the base of Q101. Thus, the differential effect of the feedback favors that applied at Q101. If the control voltage increases positively, turning on Q107, an in phase signal will be applied in the feedback network. In Q104, Q105 it will tend to cause regeneration, offset by a larger degenerative effect at Q101, Q102. The net effect upon the AGC output, which rejects the common mode element, is a gain reduction. If the control voltage decreases, turning on Q109, an out of phase signal will be applied in the feedback network, and it will primarily cause regeneration in Q101, Q102 and an increase in gain.

The output of AGC amplifier is derived between the bases of Q102, Q103 and reflects the composite affect of direct signal application of Q103 and internal feedback to both Q102, Q103 under D.C. control. Using the indicated amplifier parameters, the AGC amplifier exhibits a full gain of approximately 10 db. At full gain the amplifier exhibits a frequency selectivity peak at 3.58 megacycles with a bandwidth of about 3 megacycles. At minimum gain (6 db attenuation) the amplifier exhibits an essentially linear gain characteristic from 1 megacycle to 10 megacycles.

A mathematical analysis of the circuit shows that the frequency peak $\omega_p$, which approximates the geometric mean of the product $\omega_i$ and $\omega_o$:

$$\omega_p \approx \sqrt{\omega_o \cdot \omega_i} \qquad (1)$$

where $\omega_o$ is the upper cut off frequency of the amplifier, typically 30πM radians or 15 MHz, and $\omega_i$, the low pass cut off frequency of the feedback network, being defined:

$$_i = [1/C_{19} (R_5 + R_{19} + R_9)] \qquad (2)$$

where $C_{19}$ is the signal coupling capacitance (50 pf), $R_5$ is the serial signal coupling resistance (510 ohms), $R_{19}$ is the feedback resistance (2.2 K ohms).

An examination of expression (2) indicates that $107_p$ can be "tuned" to the proper center frequency by adjusting capacitor 19.

For stability the D.C. gain ($A_o$) from the base of Q104 to the emitter output of Q110 should be close to unity (normally less than 1.3 with the indicated circuit values).

The gain is controlled by the signal R6 and feedback R9 resistances, and the internal resistance ($R_{19}$) of the source 50. Normally, the $R_{19}$ should be small, preferably less than 100 ohms, in the interests of gain.

The remainder of the circuit of FIG. 4 operates in the manner atrributed to the block diagram of FIG. 3 and will be discussed in general terms. The chrominance signal derived from the output of the AGC amplifier 52 (comprising transistors Q101 to Q110) is supplied to the bases of differentially connected transistors Q146, Q147 which form the lower rank of the R – Y four-quadrant multiplier (54), whose upper rank comprises transistors Q136, Q137, Q138, Q139. At the same time the chrominance signal is applied to the bases of differentially connected transistors Q144, Q145 which form the lower rank of the B – Y demodulator 53, whose upper rank comprises the transistors Q140, Q141, Q142, Q143.

The output of the R–Y demodulator 54 is coupled through transistor amplifiers Q166, Q167 to the automatic phase control loop as well as to the RGB matrix 51. That matrix comprises the circuit associated with transistors Q170 through Q175, Q182, Q183, Q185. Similarly, the output from B – Y multiplier 53 is coupled through emitter followers Q164, Q165 to the RGB matrix. The Y signal is applied to the pad P108, amplified in the gated luminance amplifier comprising transistors Q176, QP5, Q180, Q184 and diodes Q177, Q193, Q181 and mised in the RGB matrix with the outputs of the two demodulators. The separate RGB signals are derived at the pads P109, P110 and P111, respectively.

The gated luminance amplifier is gated to provide horizontal blanking. The transistors QP5, Q178 and Q184 provide luminance amplification while the transistor Q180 connected in shunt with the input junction of luminance output amplifier Q184 provides blanking. The base of transistor Q180 is coupled to a voltage divider comprising a 10K ohm resistance and a forward conducting diode Q181 which is grounded through a small resistance. During video, the diode Q181 clamps the base of transistor Q180 to near ground potential, holding it in a nonconductive stage, and allowing normal luminance amplification by Q184. During the horizontal burst, pulse, however, a positive going burst pulse is applied through the diode Q193 to the cathode of diode Q181, temporarily blocking that diode, and unclamping the base of transistor Q180. Under these conditions, transistor Q180 saturates and provides a low impedance path in shunt with the input junction of luminance amplifier Q184, disabling it during the pulse.

The RGB matrix contains three closely similar stages for providing the individual RGB color signals required for operating the cathode ray tube. Of interest is the method of adding the R–Y and B–Y outputs to the Y luminance signal. Considering the red portion of the matrix which comprises transistors Q172, Q173 and Q183, the Y signal derived from the collector of luminance amplifier Q184 is applied directly to the base of Q172. The R – Y signal, however, is "turn around" coupled by connection of the complemented outputs between the base and emitter of the input transistor Q172. "Turn around" coupling is similarly used in the B amplifier and through a symmetrical resistance matrix to the G amplifier. The advantage of the foregoing method of combining the complemented color difference signals derived in the individual multipliers with the Y signal is the gain advantage (6 db) from using the balanced drive and at the same time the discrimination against that symmetric noise which equally affects each phase of the push-pull signal with respect to ground.

In the automatic phase control loop, the error voltage derived at the emitters of Q166, Q167 from the demodulator 54, is applied to the gated APC amplifier comprising the circuitry associated with transistors Q112, Q113, Q168, QP7, QP8, QP9. The external APC filter is coupled to the pad P103. The VCO amplifier which is controlled by the filtered D.C. output from the APC amplifier, comprises the circuitry associated with transistors Q114 – Q120. The external resonant circuit is coupled by the pads P104 and P105 between the emitter of Q118 and the base of Q120. The external phase shift network 57 is connected between the pads P105 and P106. The R – Y color reference amplifier comprising transistors Q130, Q131, Q132 has its input connected to the pad P106 for acceptance of the delayed VCO output and its output is coupled from the collectors of differentially connected transistors Q130, Q131 to the bases of the R – Y demodulator 54. The B – Y color reference amplifier 59 comprising transistors Q121, Q122 and Q169, has its input coupled to the undelayed VCO output and the complement. The output of 59 is supplied to the bases of B – Y demodulator 53.

The color reference gate 60 which controls color reference amplifiers 58 and 59, comprises the transistors QP1, Q133, and sundry associated impedances. The gate circuit 60 acts in response to a D.C. chrominance control comprising a potentiometer coupled to the pad P107; to the color killer operating through the transistor Q134; and thirdly, to a burst pulse applied to the base of transistor Q133. In consequence of gate circuit operation, a gain control voltage is applied to the base of Q132 of the R – Y reference amplifier 58 and to the base of Q169 of the B – Y reference amplifier 59 which establishes the level of VCO injection into both demodulators. During burst, transistor Q133 is turned on saturating, causing transistor QP1 to be turned on, also to saturation. This allows the bases of Q132, Q169 to reach a prescribed forward bias corresponding to maximum current in the R – y and B – Y reference amplifiers for optimum APC and ACC loop operation. The low impedance of QP1, when saturated during burst in relation to the 6K ohms series resistance in the path of the manual color potentiometer, makes the current level of Q132, Q169 substantially independent of the manual color control setting. During video, transistor Q133 becomes nonconductive, and the current in reference amplifiers Q132, Q169 is subject to control by the manual color control potentiometer.

The color killer 62, which is associated with the color reference gate circuit, comprises the transistors QP4, Q135 and Q134. The circuit senses the ACC control voltage which is applied to the base of QP4. In the event that the ACC voltage falls below a desired threshold, the transistor Q134 saturates, effectively earthing the collector of Q134 and turning off transistors Q132 and Q169 during video. During burst, however, the color killer is ineffective due to the 3K serial resistance in the control path, and stages Q132 and Q169 are momentarily restored in full gain condition, irrespective of the color killer setting.

The gated tint control 61, which is also in the phase lock loop, comprises the circuitry associated with transistors Q123 through Q129. The tint control responds to an external potentiometer coupled with pad P101 and affecting the base bias of transistor Q128. The tint control is gated to function only during burst, the transistor Q129 providing such gating operation by controlling the emitter current of all the transistors Q123 through Q128.

The transistors Q123 to Q126 are arranged in an upper rank in a double balanced configuration, with their emitter currents being subject to control by lower rank transistors Q127, Q128. The latter are differentially connected and derive their current from gating transistor Q129. The bases of upper rank transistors Q124, Q125 are supplied with the VCO output at zero phase, while the bases of transistors Q123, Q126 are provided with the complemented zero phase output. The collectors of Q123 and Q125 are joined as are the collectors of Q124 and Q126. Thereby the composite output of the tint amplifier is either at zero phase or in 180° complemented phase with an amount which is determined by the potentiometer setting on lower rank transistor Q128. This voltage, as earlier explained, is combined at the output of the reference R – Y reference amplifier 58 so as to provide a resultant wave applied to the R – Y multiplier which varies from plus to minus 45° from a nominally 70° delayed position. The overall operation of the tint control circuit was described in connection with FIG. 3.

The balance of the circuit is directed to the time sharing operation, and to the provision of suitable biasing potentials and the external outboarded components. The time sharing has been characterized in the description of each individual circuit. The power source includes acitve elements Q157–Q163 coupled between P113 and P114 and includes a pair of outboarded capacitors of 100 mf and 0.05 mf and a positibe bias source of typically +12 volts.

Although the invention has been described with reference to two practical embodiments, it will be appreciated that various modifications may be made by those skilled in the art without departing from the spirit and scope of the invention.

Thus, while the underlying circuitry is complex, the demodulator may be fabricated in a number of topological forms. Assuming integrated circuit fabrication, the boundary precluding further integration is usually defined in terms of several parameters, including the pin requirements. Should the pin requirements permit larger number of pins than the 14 to 16 herein contemplated, the present demodulator could be incorporated into a more complex array. Similarly, should the pin economies dictate a smaller package, the non-time multiplexed circuit elements could be divorced from the present package without electrical penalty, In the FIG. 1 embodiment the color matrix is omitted, while in the FIG. 3 embodiment, this function is included. It may optionally be omitted without direct electrical penalty.

While expensive, the circuit can, of course, be carried out in simple discrete form, or using "IC's" at a lower level of integration.

The electrical advantages of the overall circuit arise in several respects. The first is that employing demodulation of this nature, one may use the same demodulator for deriving the control information during one moment and deriving a color difference component during the succeeding moment. The second advantage most particularly felt in respect to the time sharing of the phase control function and the demodulation function is that the potential for undesired mutual drift in these demodulation functions is substantially eliminated. In a practical embodiment, should one desire the picture to be always portrayed with true transmitted hue fidelity, and assuming a stable phase shift network, the tint control could be eliminated.

The practical circuit of the first embodiment is designed for use at the IQ demodulation angle, although a shift toward R – Y, B – Y angles is also possible without circuit change, with some loss of adjustment of tint control. The difference between detection angles of the practical circuit of the first embodiment is designed to be 90°. However, other circuit implementations of the block diagram of FIG. 1 may employ other than 90° relative detection angle settings.

The second embodimnt may be used with the common R – Y, B – Y, or IQ demodulation angles or customary unnamed departures from these nominal angles by a suitable delay line selection. The second embodiment may also use mutually non-orthogonal detection angles by using a phase shift of from 70° to 90°. Here, the change does not require a circuit change but rather a change in the external delay line. In the event that an "opened" detection angle is employed, the tint control may then be used to introduce a 10° offset making both detection angles depart from the true R – Y, B – Y, axes by 10°.

What we claim as new and desire to secure by Letters Patent of the United States is:

1. A multiplex demodulator for a color television signal comprising:

a. a source of detected video signals including a luminance signal; a chrominance signal having two chrominance components modulated in quadrature on a color subcarrier; and a color burst signal at the frequency of said color subcarrier and in phase therewith, said color burst occuring in alternation with the luminance and chrominance signal;

b. wave generating means included in an automatic phase control loop for locally generating a wave at the frequency of and in predetermined phase relationship to said color burst;

c. a first four-quadrant multiplier having an output of said video source coupled to one input, and an output of said wave generating means coupled to the other input for synchronously demodulating said chrominance signal at a pre-assigned angle by multiplication;

d. a second four-quadrant multiplier having an output of said video source coupled to one input, and an output of said wave generating means coupled to the other input for synchronously demodulating said chrominance signal and said color burst at pre-assigned angles by multiplication, the detection angles of said chrominance information in said two multipliers being substantially mutually orthogonal; said burst being detected in quadrature in said second multiplier;

e. means coupled to the output of said second multiplier for deriving an error voltage representative of the phase difference between said burst and the output of said wave generating means and applying said error voltage in said automatic phase control loop to said wave generating means for achieving said predetermined phase relationship; and f. means coupled to the outputs of said first and said second multipliers for deriving two substantially mutually orthogonal chrominance signals.

2. A television demodulator as set forth in claim 1 wherein:

a. said first four-quadrant multiplier synchronously demodulates both said chrominance signal and said color burst, and wherein b. the detection angles of said burst in said two multipliers are substantially mutually orthogonal, and having in addition thereto, c. an automatic gain control network comprising amplification means of controllable gain introduced between the output of said video source and the inputs of said multipliers for amplifying said chrominance signal and said color burst prior to application to said multipliers, and means coupled to the output of said first multiplier for deriving a voltage representative of the magnitude of said burst for control of said amplification means.

3. A television demodulator as set forth in claim 2 wherein:

a. the output of said wave generating means is coupled to said other inputs of said two multipliers in like phase and amplitude during burst, and in like phase and amplitude during video; and having in addition thereto b. phase shift means introduced between the output of said video source and the inputs of said multipliers for introducing a relative delay between the signals applied to said two multipliers during burst suitable for phase and amplitude control, and a relative delay between the signals applied to said two multipliers during video, suitable for derivation of two color components.

4. A television demodulator as set forth in claim 3 wherein a. said phase shift means are provided with a gated, manual phase control means for coupling waves to the one inputs of said multipliers, the phase of said manual control means being subject to manual adjustment during burst for manual tint control, and the phase thereof being fixed during video, and having in addition thereto b. gated, manually controlled amplification means introduced between the output of said wave generating means and the other inputs of said multipliers, for coupling waves to said multipliers of fixed amplitude during burst, and for coupling waves whose amplitude is subject to manual adjustment during video for manual color control.

5. A television demodulator as set forth in claim 4 wherein a. said phase shift means further includes a delay line coupled to the output of said video source for delaying the burst and chrominance signals in relation to the undelayed burst and chrominance signals, said delay amounting to 90° at said color subcarrier frequency, b. means coupling the undelayed and delayed signals in separate paths to said gated manually controlled phase shift means, and wherein c. said gated manually controlled phase shift means are formed into two channels, one for phase control of the video and burst supplied to one multiplier and the other for phase control of the video and burst supplied to the other multiplier.

6. A television demodulator as set forth in claim 4 wherein a. said phase shift means further includes a delay line coupled to the output of said video source for delaying the burst and chrominance signals in relation to the undelayed burst and chrominance signals, said delay amounting to 90° at said color frequency, b. means coupling the undelayed and delayed signals in separate paths to said automatic gain controlled amplification means, and wherein c. said automatic gain controlled amplification means are formed into two channels, one for undelayed video and burst and the other for delayed video and burst; and wherein c. said gated manually controlled phase shift means are formed into two channels, said channels having their inputs coupled to the outputs of said automatically gain controlled amplification means, one channel being for phase control of video and burst supplied to one multiplier and the other channel being for phase control of the video and burst supplied to the other multiplier.

7. A television demodulator as set forth in claim 6 wherein a. each channel of said phase shift means comprises a first and a second differential transistor amplifier, said undelayed signal being coupled to the base of the first amplifier and the delayed signal being coupled to the base of the second amplifier, advancing said manual tint control causing an increase in the emitter current in said first amplifier while occasioning a like decrease in the emitter current in said second amplifier and corresponding changes in output signals, the outputs of said first and second differential amplifiers being summed so that the phase of the resultant in said channel will very in response to said manual control, the application of the undelayed and delayed signals to said first and second amplifiers being reversed between said two channels, and wherein b. the manual control of said two channels are ganged so as to occasion simultaneous change in phase in said two channels, both channels having a relative delay of approximately 90° at any arbitrary setting, adjustment causing the phase in both channels to vary in the same direction so as to maintain said 90° relative delay.

8. A television demodulator as set forth in claim 6 having in addition thereto color demodulation disabling means responsive to said burst output of said first multiplier for decoupling said wave generating means from said other inputs of said multipliers during video, while said burst is below a predetermined level.

9. A television demodulator as set forth in claim 1, wherein a. the output of said wave generating means is coupled to said other inputs of said two multipliers in like phase and amplitude during video, and having in addition thereto:

b. phase shift means introduced between the output of said video source and the input of said multipliers for introducing a delay to the signal applied to said second multiplier during burst suitable for phase control; and a relative delay between the signals applied to said two multipliers during video, suitable for derivation of two color components.

10. A television demodulator as set forth in claim 9 wherein said phase shift means are provided with a gated, manual, phase control means for coupling waves to the one input of said second multiplier, the phase shift of said control means being subject to manual adjustment during burst for manual tint control, and the phase shift thereof being fixed during video.

11. A television demodulator as set forth in claim 9 having in addition thereto gated, manually controlled amplification means introduced between the output of said wave generating means and said other inputs of said two multipliers, for coupling waves to said multipliers of fixed amplitude during burst, and for coupling waves whose amplitude is subject to manual adjustment during video for manual color control.

* * * * *